United States Patent [19]

Nagai et al.

[11] Patent Number: 5,879,439
[45] Date of Patent: Mar. 9, 1999

[54] RECORDING INK COMPOSITION AND RECORDING METHOD USING THE SAME

[75] Inventors: Kiyofumi Nagai; Akio Kojima, both of Tokyo; Masato Igarashi; Akiko Konishi, both of Kanagawa; Hiroyuki Mochizuki, Tokyo; Masayuki Koyano, Kanagawa; Ikuko Tanaka, Tokyo; Takanori Tsuyuki, Kanagawa, all of Japan

[73] Assignee: Ricoh Company, Ltd., Tokyo, Japan

[21] Appl. No.: 905,050

[22] Filed: Aug. 1, 1997

[30] Foreign Application Priority Data

| Aug. 8, 1996 | [JP] | Japan | 8-227600 |
| Aug. 19, 1996 | [JP] | Japan | 8-219339 |
| Feb. 13, 1997 | [JP] | Japan | 9-044792 |

[51] Int. Cl.$^6$ ..................... C09D 11/02
[52] U.S. Cl. ..................... 106/31.28; 106/31.43; 106/31.47; 106/31.58; 106/31.65; 106/31.77; 106/31.78
[58] Field of Search ............... 106/31.28, 31.43, 106/31.47, 31.58, 31.65, 31.77, 31.78

[56] References Cited

U.S. PATENT DOCUMENTS

| 4,664,708 | 5/1987 | Allen | 106/31.43 |
| 4,692,190 | 9/1987 | Mayer et al. | 106/31.48 |
| 4,711,668 | 12/1987 | Shimada et al. | 106/31.52 |
| 4,793,860 | 12/1988 | Murakami et al. | 106/31.52 |
| 5,431,720 | 7/1995 | Nagai et al. | 106/31.58 |
| 5,514,208 | 5/1996 | Nagai et al. | 106/31.43 |
| 5,534,052 | 7/1996 | Mennicke et al. | 106/31.43 |
| 5,621,022 | 4/1997 | Jaeger et al. | 106/31.43 |
| 5,622,550 | 4/1997 | Konishi et al. | 106/31.59 |
| 5,756,561 | 5/1998 | Wang et al. | 106/31.28 |
| 5,810,915 | 9/1998 | Nagai et al. | 106/31.59 |

*Primary Examiner*—Helene Klemanski
*Attorney, Agent, or Firm*—Oblon, Spivak, McClelland, Maier & Neustadt, P.C.

[57] ABSTRACT

A recording ink composition includes a colorant comprising a pigment which is soluble or dispersible in water, and a polymeric dye having a weight average molecular weight in a range of 5,000 to 15,000, a dispersant including at least one dispersant component selected from the group consisting of at least one polymeric compound having a hydrophilic moiety and a hydrophobic moiety, and/or at least one surfactant having an alkyl group having 5 or more carbon atoms, water, and a water-soluble organic solvent, and a method of recording images on an image receiving medium is performed, using the recording ink composition.

55 Claims, No Drawings

RECORDING INK COMPOSITION AND RECORDING METHOD USING THE SAME

BACKGROUND OF THE INVENTION

1. Field of the Invention

The present invention relates to a recording ink composition suitable for an ink-jet printer, aqueous writing utensils, various kinds of recorders and pen plotters, and more particularly to a recording ink composition capable of producing color images on a sheet of plain paper by an ink-jet printing method. The present invention also relates to a method of recording images, using the above-mentioned recording ink composition.

2. Discussion of Background

Ink-jet printers have been widely utilized in recent years because of the advantages of low noise and low running cost, and color ink-jet printers capable of producing color images on a sheet of plain paper have also been placed on the market.

With respect to such ink-jet printers, however, it is required to satisfy all the requirements, such as excellent color reproduction of color image, high water- and light-resistances of the obtained image, sufficient drying characteristics of the image, high image quality without blurring, and the reliability of ink-ejection from the printer.

When the color images are produced, in particular, by using the color ink-jet printer, image blurring easily takes place in two-color-superimposed color image portions of red color, green or blue color and also in the boundaries thereof, even though image clearness is sufficient in a single-colored image portion, using a yellow, magenta or cyan color ink composition of a single color.

Particularly, when an ink deposited on a sheet of paper is dried without any specific image-fixing unit, the drying characteristics of the ink are improved by increasing the penetrating property of the ink through the paper as described in Japanese Laid-Open Patent Application 55-29546. However, because of the improved penetrating property of the ink through paper, blurred images are apt to be formed and the sharpness of the obtained images is lowered depending on the kind of recording paper to be employed.

In Japanese Patent Publication 60-23793, it is described that a dialkylsulfosuccinate is contained in the ink composition thereof as a surfactant, whereby the drying characteristics of images obtained by ink-jet recording can be improved and the reduction of the sharpness of the obtained images is minimized. However, when such an ink composition is used in ink-jet printing, the diameters of picture elements of the obtained image considerably vary depending on the kind of image receiving sheet to be employed. As a result, the image density of the printed images is considerably decreased, and the sharpness of the printed images is lowered. In addition, this kind of surfactant is easily decomposed if the pH of the ink composition is on an alkaline side, so that the effect of the surfactant is lost during the storage of the ink composition and precipitates are formed in the ink composition. As a result, the nozzles of an ink-jet printer may be easily clogged with the precipitates in the ink composition, which will lower the reliability of ink-ejection performance.

In Japanese Laid-Open Patent Application 56-57862, it is disclosed that the drying characteristics of the images recorded by ink-jet printing can be improved by using an ink composition in which a strongly basic material is contained. In the case where images are formed, using this ink composition, on a so-called acidic paper which has been sized using rosin, the drying characteristics of the images can be improved. However, in the case of a paper in which an alkyl ketene dimer or an alkenyl sulfosuccinic acid is used as a sizing agent, no improvement is observed in the drying characteristics of images formed on the paper. Even in the case of the acidic paper, no improvement is observed in the drying characteristics of the two-color-superimposed image portion on the acidic paper.

In Japanese Laid-Open Patent Application 1-203483, there is proposed a recording ink composition comprising a polyhydric alcohol derivative and pectin, in which pectin serves as a thickening agent for preventing the spreading or the blurring of recorded images. However, pectin is a nonionic material having a hydroxyl group as a hydrophilic group, so that it has the shortcoming that ink ejection reliability is low when the printing operation is resumed after intermission.

Dyes for the ink composition for use in ink-jet printing are being improved in order to obtain satisfactory color reproduction performance and excellent light resistance and water resistance of color images formed on a sheet of plain paper at the same time. However, it is still difficult to obtain a dye for an ink composition which is capable of producing color images with improved light and water resistances, while retaining high reliability of ink-ejection performance.

It is conventionally proposed to use various pigments for the ink composition in order to obtain satisfactory water resistance and light resistance of the recorded ink image. However, such pigments have a problem with respect to color tone, and therefore are now used only in an ink composition for a large-sized plotter which is required to produce images with extremely high light resistance. When such a pigment is used in an ink composition for an ink-jet printer which is designed to produce images with high resolution, there occurs a problem that the nozzle of the printer is easily clogged with the ink composition, so that the reliability of the ink ejection performance is extremely lowered.

In Japanese Patent Publication 60-45669 and Japanese Laid-Open Patent Application 6-100812, it is proposed to use a pigment and a dye in combination in order to improve the color tone, the color reproduction performance, the light resistance and water resistance of the printed images, and the reliability of the ink ejection performance.

The ink composition disclosed in Japanese Patent Publication 60-45669 has the problems that the light resistance of the employed dye is insufficient for use in practice, the penetrating performance of the ink composition through plain paper is not sufficient and that the color development performance thereof is not satisfactory.

The ink composition disclosed in Japanese Laid-open Patent Application 6-100812 has sufficiently good light resistance in comparison with the ink composition disclosed in Japanese Patent Publication 60-45669, but has the problems that the color development performance is poorer than that of the ink composition disclosed in Japanese Patent Publication 60-45669, and that two-color superimposed image portions tend to become dull, in particular, with respect to the development of a blue color.

In Japanese Laid-Open Patent Applications 60-38481 and 60-38482, there are disclosed recording ink compositions in which a polymeric dye having a sulfonic acid group which is in the form of a salt in combination with a basic dye. These recording ink compositions have the shortcomings that the light resistance thereof is insufficient for use in practice and that the nozzles of the ink-jet printer are easily clogged with the recording ink compositions, and lack in the reliability of ink ejection performance.

Thus, it is extremely difficult to obtain a recording ink composition with excellent color tone and color reproduction performance, which is capable of producing clear color images free from blurring and spreading, with high water resistance and light resistance, and is suitable for ink-jet printing with high reliability of ink-ejection performance.

SUMMARY OF THE INVENTION

It is therefore a first object of the present intention to provide a recording ink composition with excellent color tone and color reproduction performance, particularly in two-color-superimposed portions, which recording ink composition is capable of producing clear color images free from blurring and spreading, with high water resistance and light resistance, and is suitable for forming images with excellent transparency on a transparent sheet for an overhead projector (OHP).

A second object of the present invention is to provide a recording ink composition comprising a colorant having excellent dispersion stability, which recording ink composition has excellent storage stability; and highly reliable ink-ejection stability even after prolonged storage of the ink composition or after intermission of printing operation.

A third object of the present invention is to provide a recording ink composition having high permeability into plain paper, capable of producing clear and sharp images with high drying performance, free from spreading or blurring.

A fourth object of the present invention is to provide a recording ink composition with excellent color reproduction performance with a color of magenta, and a recording ink composition with excellent color reproduction performance with a color of cyan.

A fifth object of the present invention is to provide a method of recording images with high water resistance and light resistance, excellent color reproduction, clarity and high resolution, by ink-jet printing using the above-mentioned recording ink composition.

The first to third objects of the present invention can be achieved by a recording ink composition which comprises a colorant comprising a pigment which is soluble or dispersible in water, and a polymeric dye having a weight average molecular weight in a range of 5,000 to 15,000, a dispersant comprising at least one dispersant component selected from the group consisting of at least one polymeric compound having a hydrophilic moiety and a hydrophobic moiety, and/or at least one surfactant having an alkyl group having 5 or more carbon atoms, water, and a water-soluble organic solvent.

The fourth object of the present invention can be achieved by the above-mentioned recording ink composition in which as the colorant is used a colorant which comprises a pigment comprising at least one pigment component selected from the group consisting of a quinacridone pigment of formula (P-1),

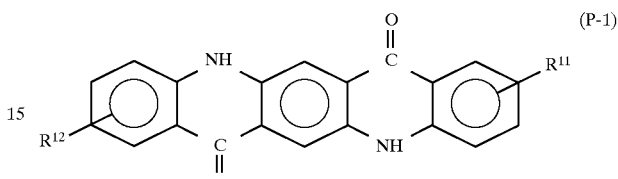

wherein $R^{11}$ and $R^{12}$ are each an alkyl group, a halogen atom, or a hydrogen atom, and a phthalocyanine pigment of formula (P-2)

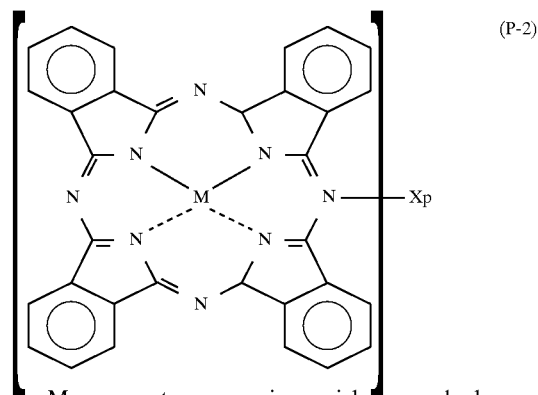

wherein M represents copper, iron, nickel or a hydrogen atom, X represents a hydrogen atom or a halogen atom, and p is an integer of 0 to 8, and the polymeric dye comprises a salt made from a polymeric compound having a sulfonic group and a basic dye.

The fifth object of the present invention can be achieved by a method of recording images on an image receiving medium, comprising the step of ejecting the above-mentioned ink composition in the form of droplets by the application of thermal or mechanical energy thereto onto an image receiving medium with a Stöckigt size degree of 3 seconds or more, with the recording ink composition being deposited in an amount of 2.0 g/m² to 20 g/m² on the image receiving medium, thereby forming images with a resolution of 10 dots/mm×10 dots/mm or more.

DESCRIPTION OF THE PREFERRED EMBODIMENTS

The recording ink composition of the present invention comprises a colorant comprising a pigment which is soluble or dispersible in water, and a polymeric dye having a weight average molecular weight in a range of 5,000 to 15,000, a dispersant comprising at least one dispersant component selected from the group consisting of at least one polymeric compound having a hydrophilic moiety and a hydrophobic moiety, and at least one surfactant having an alkyl group having 5 or more carbon atoms, water, and a water-soluble organic solvent In the present invention, by use of the above-mentioned colorant comprising a pigment which is soluble or dispersible in water, and a polymeric dye having a weight average molecular weight in a range of 5,000 to 15,000, images with high water resistance and light resistance can be obtained with excellent color tone and color reproduction.

Furthermore, by containing in the ink composition the dispersant comprising at least one dispersant component selected from the group consisting of at least one polymeric compound having a hydrophilic moiety and a hydrophobic moiety, and at least one surfactant having an alkyl group having 5 or more carbon atoms, the dispersion stability of the colorant can be improved, whereby the storage stability of the recording ink composition can be improved and accordingly ink-jet printing can be performed with highly reliable ink-ejection stability even after prolonged storage of the ink composition or after intermission of printing operation.

Furthermore, by use of the above-mentioned dispersant comprising at least one dispersant component selected from the group consisting of at least one polymeric compound having a hydrophilic moiety and a hydrophobic moiety, and at least one surfactant having an alkyl group having 5 or more carbon atoms, the permeability of the ink composition into plain paper can be increased, and therefore clear and sharp images with high drying characteristics, free from spreading or blurring, can be formed.

Examples of pigments for use in the colorant in the recording ink composition of the present invention, there can be employed can organic pigments such as azo pigments, phthalocyanine pigments, anthraquinone pigments, quinacrydone pigments, dioxazine pigments, indigo pigments, thioindigo pigments, perylene pigments, isoindolenone pigments, Aniline Black, azomethiae pigments, Rhodamine B lake pigments, and carbon black; and inorganic pigments such as iron oxide, titanium oxide, calcium carbonate, barium sulfate, aluminum hydroxide, barium yellow, prussian blue, cadmium red, chrome yellow, and metal powder.

It is preferable that the pigments for use in the present invention have a HLB (Hydrophile-Lipophile Balance) value of 11 to 20. This is because when the pigment having a HLB value of 11 to 20 is used in combination with the polymeric dye having a weight average molecular weight in a range of 5,000 to 15,000, having a carboxylic group or a sulfonic acid group in a repeating unit thereof, the dispersion stability of the colorant can be significantly improved, so that there can be obtained a recording ink composition with excellent storage stability, which is capable of forming clear images stably with highly reliable ink-ejection stability even after prolonged storage of the ink composition or after intermission of printing operation.

The pigments having a HLB value of 11 to 20 can be obtained by selecting such pigments from conventional pigments which are produced by conventional methods or by subjecting conventional pigments to an acid treatment or a low temperature plasma treatment in an atmosphere of oxygen or nitrogen to make the pigments hydrophilic.

Of the above-mentioned pigments, pigments that are particularly preferable for the formation of colored images are, for example, carbon black, modified carbon black such as carbon black modified so as to make the surface thereof hydrophilic for black ink; azo pigments such as C.I. pigment yellow 13, 17 and 174 for yellow ink; quinacridone pigments such as pigment red 122 and azo pigments such as pigment red 184 for magenta ink; and phthalocyanine pigments such as copper phthalocyanine and metal-free phthalocyanine for cyan ink.

It is preferable that the above-mentioned pigments, when used in the colorant for use in the present invention be in the form of particles having a particle diameter in a range of 0.01 $\mu$m to 0.1 $\mu$m. This is because when the particle diameter of the pigment is less than 0.01 $\mu$m, its masking force is decreased so that the obtained image density tends to be lowered, and the light resistance of the pigment also tends to be lowered, so that when the pigment having a particle size of less than 0.01 $\mu$m is used in combination with the polymeric dye having a weight average molecular weight in a range of 5,000 to 15,000, it is difficult to improve the light resistance of the obtained images so as to make the light resistance exceedingly better than that of images obtained by a conventional recording ink composition using a conventional dye. Furthermore, when the particle diameter of the pigment exceeds 0.1 $\mu$m, the nozzles of a head of an ink jet printer and a filter used in the ink jet printer tend to be clogged with the ink composition so that the reliability of ejection of ink droplets tends to be lowered.

In the present invention, as the polymeric dye having a weight average molecular weight in a range of 5,000 to 15,000, there can be employed a polymeric dye having a hydrophilic functional group such as hydroxyl group, sulfonic group or carboxylic group in a repeating unit thereof is preferable. For example, polymeric dyes with carboxylic group or sulfonic group being introduced into a chromophoric group thereof or a main skeleton thereof are preferable for use in the present invention. For the convenience of production, polymeric dyes having carboxylic group are preferable.

Specific polymeric dyes for use in the present invention are polymeric dyes derived from polyamines and acid dyes or direct dyes; polymeric dyes derived from polyarylamines, acid dyes and direct dyes; polymeric dyes derived from chitosan, acid dyes and direct dyes; and polymeric dyes in the form of a salt obtained from a polymer having an ion-dissociation group and a dye having a polarity opposite to that of the polymer.

Specific examples (a), (b), (c) and (d) of the polymeric dyes having a weight average molecular weight in a range of 5,000 to 15,000 and sulfonic group or carboxylic group in a repeating unit thereof for use in the present indention are shown in the form of free acid in TABLE 1, in which the example (a) is a polymeric dye made by Dyanpol Co., Ltd.:

TABLE 1

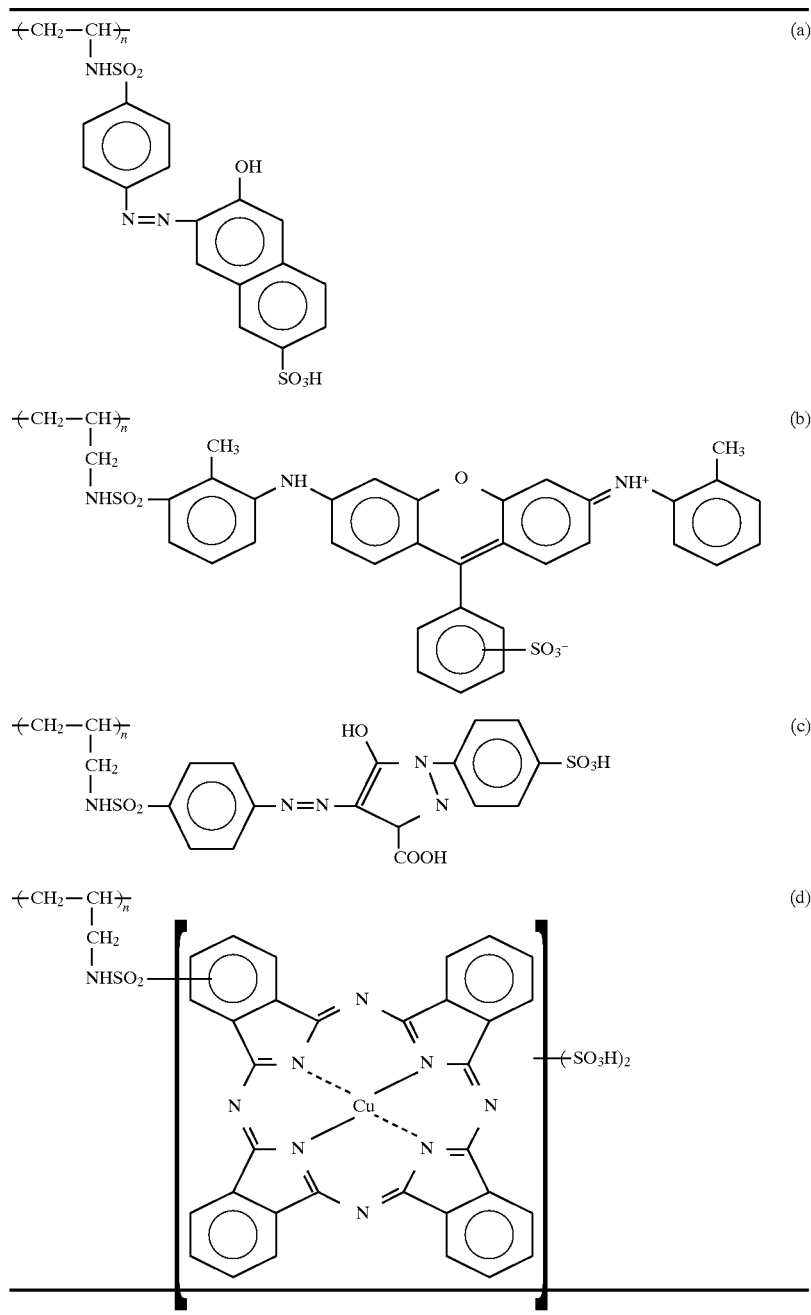

These dyes can be prepared by a conventional method as disclosed in Japanese Laid-Open Patent Application 63-30567. When these dyes are used in the present invention, it is preferable to purify the dyes by eliminating therefrom inorganic salt impurities such NaCl, $Na_2SO_4$, and $CaCO_3$, using a reverse osmosis film or an ion exchange resin. By eliminating such inorganic salt impurities from the dyes, the clogging of the nozzles of the head of an ink jet printer and the filter used therein with the ink composition can be prevented, so that the reliability of ejection of ink droplets from the ink jet printer can be significantly improved.

By using sodium cation, lithium cation, a quaternary ammonium cation of formula (3), an alkanolamine cation of formula (4), or a quaternary phosphonium cation of formula (5) as a counter ion for the polymeric dye having a weight average molecular weight in a range of 5,000 to 15,000, the solubility stability of the polymeric dye can be significantly improved:

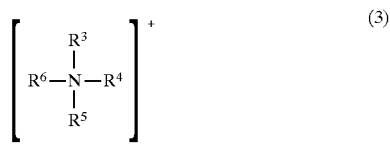

wherein $R^3$ to $R^6$ are each selected from the group consisting of a hydrogen atom, an alkyl group having 1 to 4 carbon atoms, and a halogenated alkyl group having 1 to 4 carbon atoms,

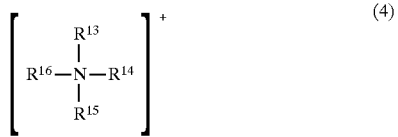

wherein at least one of $R^{13}$ to $R^{16}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms, and

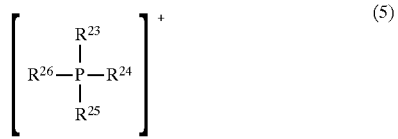

wherein $R^{23}$ to $R^{26}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

As the colorant for use in the present invention, there can be preferably employed a colorant which comprises a pigment comprising at least one pigment component selected from the group consisting of a quinacridone pigment of formula (P-1),

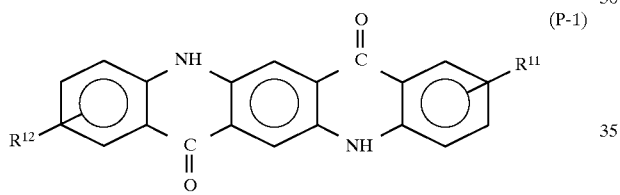

wherein $R^{11}$ and $R^{12}$ are each an alkyl group, a halogen atom, or a hydrogen atom, and a phthalocyanine pigment of formula (P-2)

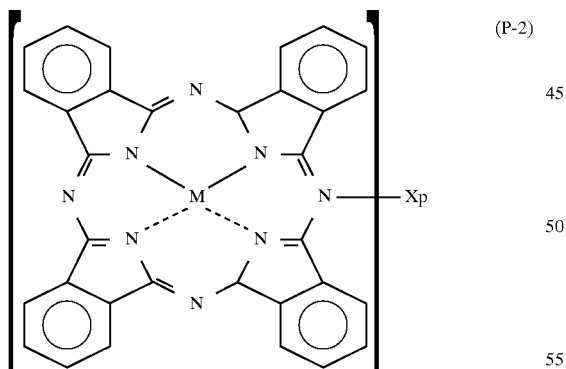

wherein M represents copper, iron, nickel or a hydrogen atom, X represents a hydrogen atom or a halogen atom, and p is an integer of 0 to 8, and a polymeric dye having a weight average molecular weight in a range of 5,000 to 15,000 which comprises a salt made from a polymeric compound having a sulfonic group and a basic dye.

By use of the above colorant, there can be obtained a recording ink composition which is capable of forming images having excellent color tone and high water resistance and light resistance, with excellent color reproduction performance.

TABLE 2 shows specific examples of the quinacridone pigment of formula (P-1) and specific examples of the phthalocyanine pigment of formula (P-2), which are respectively the following quinacridone pigments (P-1-1) to (P-1-3) and phthalocyanine pigments (P-2-1) to (P-2-7):

TABLE 2

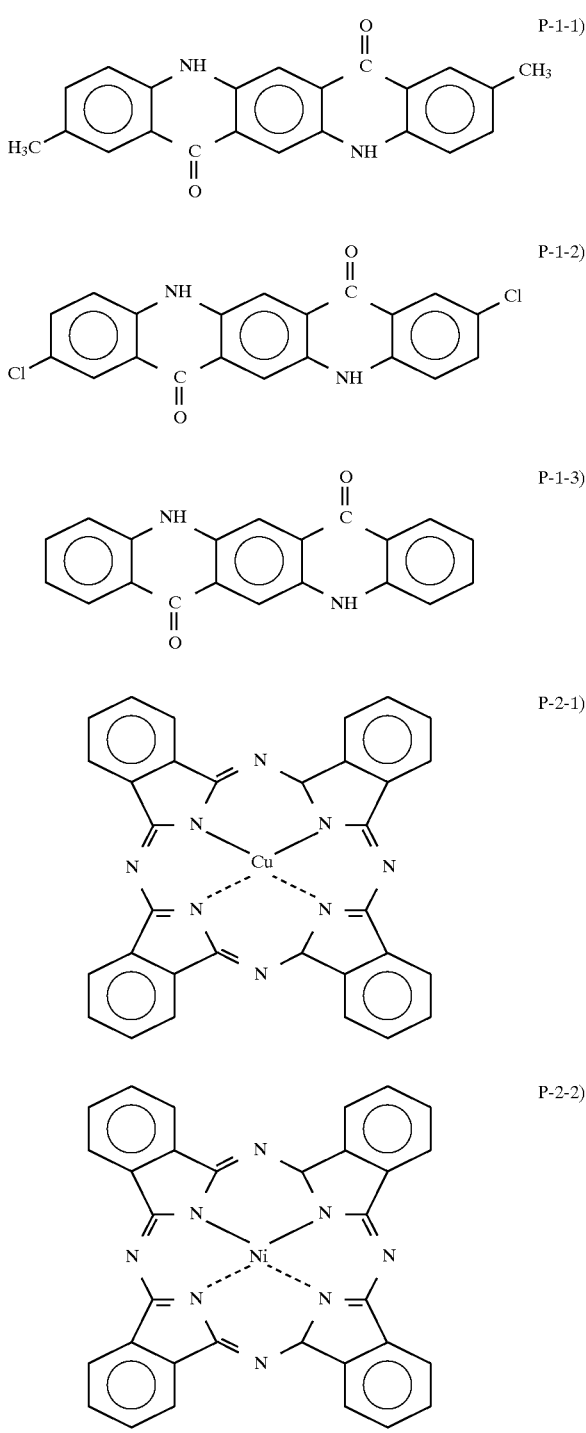

TABLE 2-continued

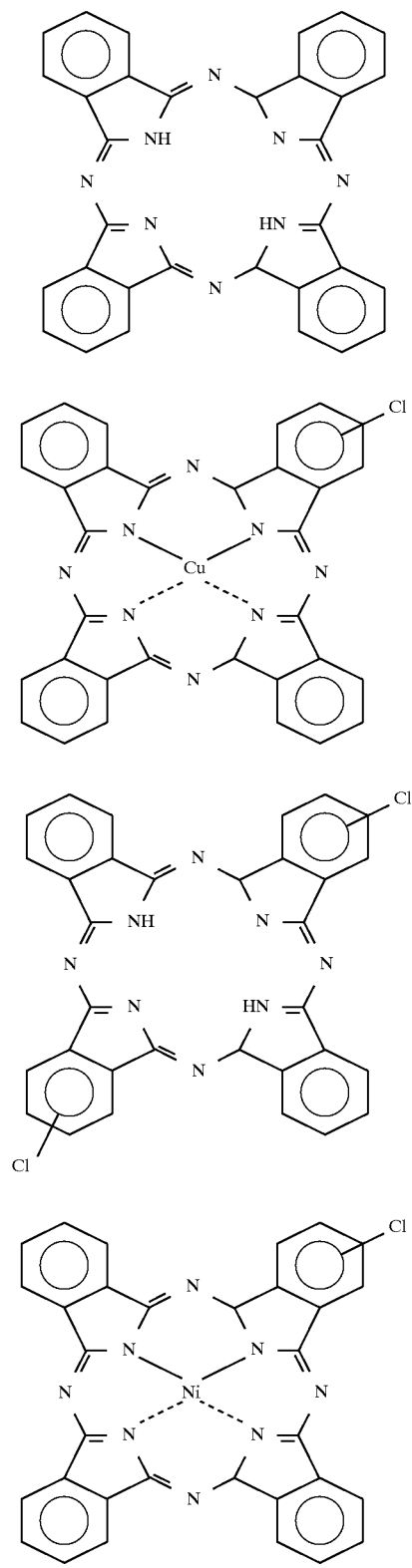

P-2-3)

P-2-4)

P-2-5)

P-2-6)

TABLE 2-continued

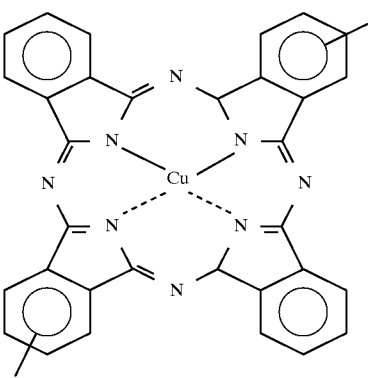

P-2-7)

As the above-mentioned polymeric dye for use in the present invention, which has a weight average molecular weight in a range of 5,000 to 15,000 and comprises a salt made from a polymeric compound having a sulfonic group and a basic dye, preferable is such a polymeric dye that is a salt prepared by allowing a polymeric compound having a sulfonic group and a hydroxyl group to react with the following basic dye of formula (BD-1) or the following basic dye of formula (BD-2) as shown in TABLE 3:

TABLE 3

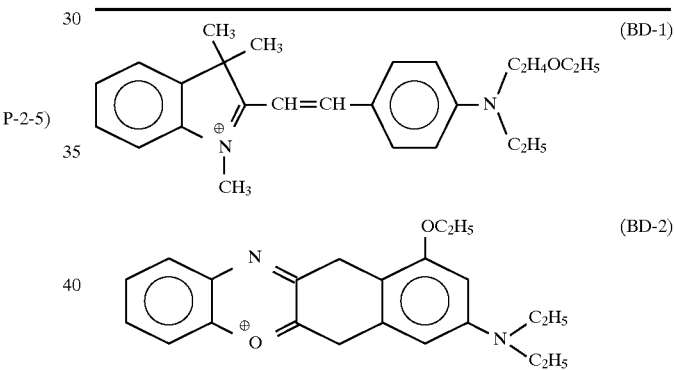

(BD-1)

(BD-2)

More specifically, preferable for use in the present invention is such a polymeric dye that is prepared in such a manner that as the polymeric compound having a sulfonic group, there is employed a copolymer prepared from p-styrene sulfonic acid and hydroxyalkylmethacrylate or hydroxyalkylacrylate, and this copolymer is allowed to react with the above basic dye of formula (BD-1) or formula (BD-2) to prepare the polymeric dye.

Particularly preferable for use in the present invention is a polymeric dye that is prepared in such a manner that as the polymeric compound having a sulfonic group, there is employed a copolymer prepared from p-styrene sulfonic acid and hydroxyethylmethacrylate or hydroxyethylacrylate, and this copolymer is allowed to react with the above basic dye of formula (BD-1) or formula (BD-2) to prepare the polymeric dye.

By using the copolymer prepared from p-styrene sulfonic acid and hydroxyalkylmethacrylate or hydroxyalkylacrylate as the polymeric compound having a sulfonic group, there can be obtained a recording ink composition which has particularly excellent dispersion stability.

TABLE 4 shows specific examples of the polymeric dyes for use in the present invention. Polymeric dyes for use in the present invention are not limited to these.

Each of the quinacridone pigment of formula (P-1) and the phthalocyanine pigment of formula (P-2) can be used in combination with the previously mentioned pigments for

TABLE 4

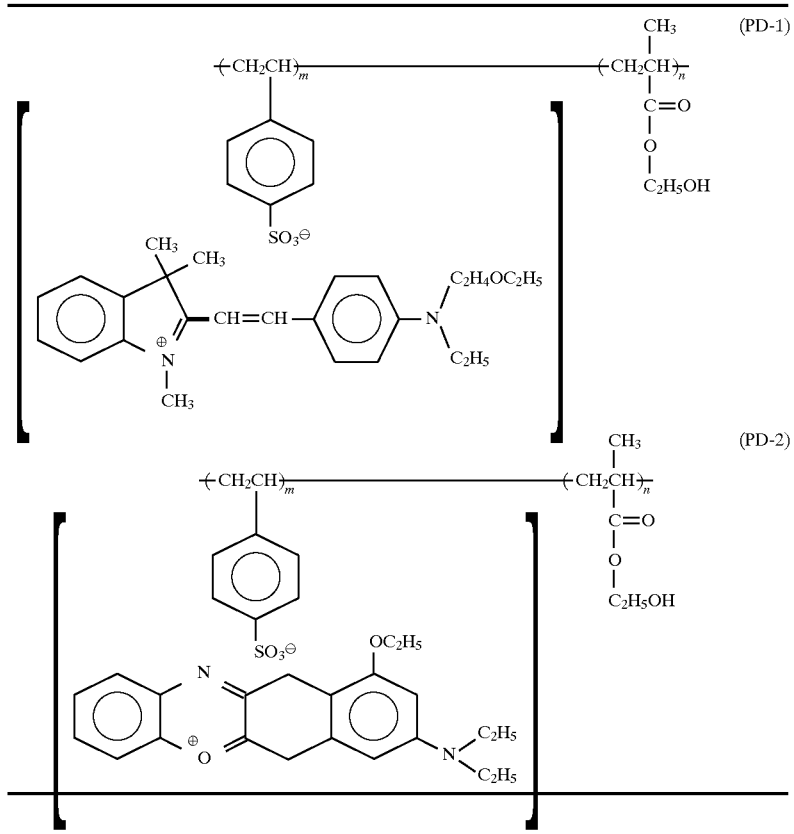

These polymeric dyes can be prepared by a conventional method as disclosed in Japanese Laid-Open Patent Application 60-385482. When these dyes are used in the present invention, it is preferable to purify the dyes by eliminating therefrom inorganic salt impurities such NaCl, $Na_2SO_4$, and $CaCO_3$, using a reverse osmosis film or an ion exchange resin. By eliminating such inorganic salt impurities from the dyes, the clogging of the nozzles of the head of an ink jet printer and the filter used therein with the ink composition can be prevented, so that the reliability of ejection of ink droplets from the ink jet printer can be significantly improved.

In the present invention, by use of the colorant comprising the quinacridone pigment of formula (P-1), and the polymeric dye of formula (PD-1) that is prepared by allowing the polymeric compound having a sulfonic group to react with, for example, the above basic dye of formula (BD-1), there can be obtained a magenta recording ink composition which is capable of forming images having excellent color tone and high water resistance and light resistance, with excellent color reproduction performance.

Furthermore, by use of the colorant comprising the phthalocyanine pigment of formula (P-2), and the polymeric dye of formula (PD-2) that is prepared by allowing the polymeric compound having a sulfonic group to react with, for example, the above basic dye of formula (BD-2), there can be obtained a cyan recording ink composition which is capable of forming images having excellent color tone and high water resistance and light resistance, with excellent color reproduction performance.

use in the present invention, for example, organic pigments such as azo pigments, anthraquinone pigments, dioxazine pigments, indigo pigments, thioindigo pigments, perylene pigments, isoindolenone pigments, Aniline Black, azomethine pigments, Rhodamine B lake pigments, and carbon black; and inorganic pigments such as iron oxide, titanium oxide, calcium carbonate, barium sulfate, aluminum hydroxide, barium yellow, prussian blue, cadmium red, chrome yellow, and metal powder.

Furthermore, by use of titanium oxide particles with a particle size of 0.1 μm or less in combination with each of the quinacridone pigment of formula (P-1) and the phthalocyanine pigment of formula (P-2), the light resistance of obtained images can be improved.

The dispersant for use in the recording ink composition of the present invention comprises at least one dispersant component selected from the group consisting of at least one polymeric compound having a hydrophilic moiety and a hydrophobic moiety, and at least one surfactant having an alkyl group having 5 or more carbon atoms.

Examples of the above-mentioned polymeric compound having a hydrophilic moiety and a hydrophobic moiety are natural hydrophilic polymers, for example, vegetable polymers such as gum arabic, tragacanth gum, guar gum, karaya gum, locust bean gum, arabinogalactan, pectin, and quince seed starch; seaweed polymers such as alginic acid, carrageenan, and agar; animal polymers such as gelatin, casein, albumin, and collagen; microbial polymers such as xanthene, and dextran; semisynthetic hydrophilic polymers, for example, cellulose polymers such as methyl cellulose, ethyl cellulose, hydroxyethyl cellulose, hydroxypropyl cellulose, and carboxymethyl cellulose; starch polymers such as starch sodium glycolate, and starch sodium phosphate; and seaweed-based polymers such as sodium alginate, and propyleneglycol alginate; and synthetic hydrophilic polymers, for example, vinyl polymers such as polyvinyl alcohol, polyvinyl pyrrolidone, and polyvinyl methyl ether; acrylic resins such as non-crosslinked polyacrylamide, polyacrylic acid and alkali metal salts thereof, and water-soluble styrene-acrylic resin; water-soluble styrene-maleic acid resin; water-soluble vinylnaphthalene acrylic resin; water-soluble vinylnaphthalene-maleic acid resin; an alkali metal salt of a condensation product of formalin and β-naphthalene-sulfonic acid; a polymeric compound comprising a salt having a cationic functional group such as quaternary ammonium or amino group on the side chain thereof; and a natural polymeric compound such as shellac wax.

As the aforementioned surfactant having an alkyl group having 5 or more carbon atoms, it is preferable to employ an anionic surfactant such as a polyoxyethylene alkyl ether acetate of formula (1),

(1)

wherein $R^1$ is a straight chain or branched alkyl group having 6 to 14 carbon atoms, $M^+$ is a cation selected from the group consisting of alkali metal cation, quaternary ammonium cation, quaternary phosphonium cation, and alkanol amine cation, and m is an integer of 3 to 12; and/or a dialkylsulfosuccinate of formula (2),

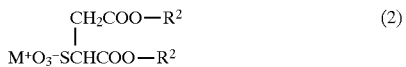

(2)

wherein $R^2$ is a branched alkyl group having 5 to 7 carbon atoms, and $M^+$ is a cation selected from the group consisting of alkali metal cation, quaternary ammonium cation, quaternary phosphonium cation, and alkanol amine cation.

In particular, by the addition of the above-mentioned polyoxyethylene alkyl ether acetate or dialkylsulfosuccinate to the ink composition, the surface tension of the ink composition can be adjusted to 50 mN/m or less, preferably 40 mN/m or less, whereby the wettability of an image receiving medium such as plain paper with the ink composition can be further improved and the penetrating performance of the ink composition into the image receiving medium can be increased. Thus, the drying characteristics of the recorded image can be increased and therefore clear images free of image blurring can be obtained.

In particular, the combined use of the above-mentioned polymeric dye having a weight average molecular weight in a range of 5,000 to 15,000 and the above-mentioned polyoxyethylene alkyl ether acetate or dialkylsulfosuccinate in the ink composition effectively works for the formation of clear images without image blurring. It is considered that in the above, the above-mentioned polyoxyethylene alkyl ether acetate or dialkylsulfosuccinate effectively controls the diffusion of the polymeric dye between the fibers of the image receiving medium and appropriately increases the viscosity of the recording ink composition.

The above-mentioned surface tension of the recording ink composition of the present invention indicates the degree of the penetration of the ink composition into a recording paper. Particularly, in the present invention, the surface tension indicates a dynamic surface tension of a droplet of the ink composition measured within a short period of time of one second or less after the formation of the surface of the droplet on the recording paper. The dynamic surface tension is entirely different from the so-called static surface tension which is measured at a saturation time in equilibrium.

In the present invention, the above-mentioned dynamic surface tension of the recording ink composition may be measured by any of the conventional methods, for example, by a method described in Japanese Laid-Open Patent Application 63-31237, in which the dynamic surface tension is determined by use of the Wilhelmy's surface balance.

In the above-mentioned anionic surfactants of formulas (1) and (2), it is especially preferable that the cation represented by $M^+$ be selected from the group consisting of $Na^+$; $Li^+$; a quaternary ammonium cation represented by $M^+$ is represented by formula (3):

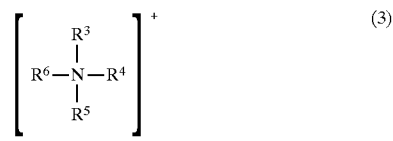

(3)

wherein $R^3$ to $R^6$ each is selected from the group consisting of a hydrogen atom, an alkyl group having 1 to 4 carbon atoms, and a halogenated alkyl group having 1 to 4 carbon atoms; an alkanolamine cation represented by $M^+$ a cation represented by formula (4):

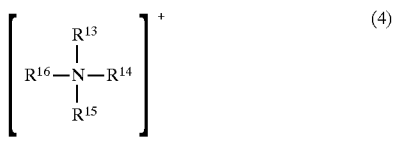

(4)

wherein at least one of $R^{13}$ to $R^{16}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms; and a quaternary phosphonium cation represented by $M^+$ is a cation presented by formula (5):

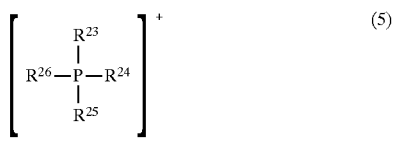

(5)

wherein $R^{23}$ to $R^{24}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

When the cation represented by $M^+$ in the formulas (1) and (2) is the above-mentioned alkali metal cation such as $Na^+$ and $Li^+$, the quaternary ammonium cation, the alkanolamine cation, or the quaternary phosphonium cation, the solubility stability of such anionic surfactants can be further improved, so that there can be obtained an ink composition with excellent preservation stability. Therefore, ink-jet printing can be stably carried out with high ink-ejection reliability even after the ink composition is allowed to stand for an extended period of time, without being used.

TABLE 5 shows specific examples of the polyoxyethylene alkyl ether acetate of formula (1) which are shown in the form of the corresponding free acids thereof:

TABLE 5

| | |
|---|---|
| $CH_3(CH_2)_{12}O(CH_2CH_2O)_3CH_2COOH$ | (1-1) |
| $CH_3(CH_2)_{12}O(CH_2CH_2O)_4CH_2COOH$ | (1-2) |
| $CH_3(CH_2)_{12}O(CH_2CH_2O)_5CH_2COOH$ | (1-3) |
| $CH_3(CH_2)_{12}O(CH_2CH_2O)_6CH_2COOH$ | (1-4) |
| $CH_3(CH_2)_{11}\underset{\underset{CH_3}{\mid}}{CH}O(CH_2CH_2O)_6CH_2COOH$ | (1-5) |
| $\begin{matrix}CH_3(CH_2)_6\\\phantom{xx}\diagdown\\\phantom{xxxxx}CHO(CH_2CH_2O)_3CH_2COOH\\\phantom{xx}\diagup\\CH_3(CH_2)_5\end{matrix}$ | (1-6) |

TABLE 6 shows specific examples of the dialkylsulfosuccinate of formula (2) which are shown in the form of the corresponding free acids:

TABLE 6

| | |
|---|---|
| $\begin{matrix}\phantom{xxxxxxxx}CH_3\phantom{xx}CH_3\\\phantom{xxxxxxxx}\mid\phantom{xxxx}\mid\\CH_2COOCHCH_2CHCH_3\\\mid\\HO_3S-CHCOOCHCH_2CHCH_3\\\phantom{xxxxxxxxxxxx}\mid\phantom{xxxx}\mid\\\phantom{xxxxxxxxxxxx}CH_3\phantom{xx}CH_3\end{matrix}$ | (2-1) |
| $\begin{matrix}\phantom{xxxxxxxx}CH_3\\\phantom{xxxxxxxx}\mid\\CH_2COOCHCH_2CH_2CH_3\\\mid\\HO_3S-CHCOOCHCH_2CH_2CH_3\\\phantom{xxxxxxxxxxxx}\mid\\\phantom{xxxxxxxxxxxx}CH_3\end{matrix}$ | (2-2) |
| $\begin{matrix}\phantom{xxxxx}CH(CH_3)_2\\\phantom{xxxxx}\mid\\CH_2COOCHCH(CH_3)_2\\\mid\\HO_3S-CHCOOCHCH(CH_3)_2\\\phantom{xxxxxxxxx}\mid\\\phantom{xxxxxxxxx}CH(CH_3)_2\end{matrix}$ | (2-3) |
| $\begin{matrix}CH_2COOCH_2CH_2CH(CH_3)_2\\\mid\\HO_3S-CHCOOCH_2CH_2CH(CH_3)_2\end{matrix}$ | (2-4) |

The polymeric dye having a weight average molecular weight in-the range of 5,000 to 15,000 with the counter cation M⁺ therefor being selected from the above-mentioned alkali metal cations, Na⁺ and Li⁺, quaternary ammonium cation, quaternary phosphonium cation, and alkanol amine cation, and the polyoxyethylene alkyl ether acetate of formula (1) or the dialkylsulfosuccinate of formula (2) with any of the same counter cation M⁺ as mentioned above can be prepared by adding sodium hydroxide, lithium hydroxide, and any of the hydroxides listed in TABLE 7 are respectively added to free acids corresponding to the polymeric dye and the polyoxyethylene alkyl ether acetate of formula (1) or the dialkylsulfosuccinate of formula (2).

TABLE 7

| | |
|---|---|
| $\left[H_3C-\underset{\underset{CH_3}{\mid}}{\overset{\overset{CH_3}{\mid}}{N}}-CH_3\right]^+ OH^-$ | (3-1) |
| $\left[H_5C_2-\underset{\underset{C_2H_5}{\mid}}{\overset{\overset{C_2H_5}{\mid}}{N}}-C_2H_5\right]^+ OH^-$ | (3-2) |
| $\left[H_3C-\underset{\underset{C_2H_4OH}{\mid}}{\overset{\overset{C_2H_4OH}{\mid}}{N}}-CH_3\right]^+ OH^-$ | (3-3) |
| $\left[H_3C-\underset{\underset{C_3H_7}{\mid}}{\overset{\overset{C_3H_7}{\mid}}{N}}-C_3H_7\right]^+ OH^-$ | (3-4) |
| $\left[H_3C-\underset{\underset{C_3H_6Cl}{\mid}}{\overset{\overset{C_3H_6Cl}{\mid}}{N}}-C_3H_6Cl\right]^+ OH^-$ | (3-5) |
| $\left[H_9C_4-\underset{\underset{C_4H_9}{\mid}}{\overset{\overset{C_4H_9}{\mid}}{N}}-C_4H_9\right]^+ OH^-$ | (3-6) |
| $\left[H_5C_2-\underset{\underset{C_2H_5}{\mid}}{\overset{\overset{C_2H_5}{\mid}}{P}}-C_2H_5\right]^+ OH^-$ | (3-7) |
| $\left[H_3C-\underset{\underset{C_2H_4OH}{\mid}}{\overset{\overset{C_2H_4OH}{\mid}}{P}}-CH_3\right]^+ OH^-$ | (3-8) |
| $(C_2H_5OH)_3N\cdot H^+$ | (3-9) |

It is not always necessary that all of the counter cations represented by M⁺ be selected from the group consisting of the above-mentioned cations, that is, sodium cation, lithium cation, the quaternary ammonium cation of formula (3), the quaternary phosphonium cation (4), and the alkanolamine cation (5). Other alkali cations may be added thereto.

In the present invention, it is preferable that the polyoxyethylene alkyl ether acetate of formula (1) or the dialkylsulfosuccinate of formula (2) be employed in an amount in the range of 0.05 to 10 wt. % of the entire weight of the ink composition in order to impart suitable penetrating performance to the ink composition for the penetration of the ink composition into an image receiving medium. If the amount of such an anionic surfactant is less than 0.05 wt. %, the ink composition tends to spread at the boundaries of two-color superimposed portions, resulting in the formation of blurred images. On the other hand, when the amount of the anionic surfactant exceeds 10 wt. %, the polyoxyethylene alkyl ether acetate of formula (1) or the dialkylsulfosuccinate of formula (2) tends to be precipitated at low temperatures, and the colorant also tends to be precipitated, with the result that the ejection reliability of the ink composition in the ink-jet printing operation is lowered.

In the present invention, it is also preferable that at least one of the surfactants having an alkyl group having 5 or more carbon atoms be a nonionic surfactant having a polyoxyalkylene group.

Specific examples of preferable nonionic surfactants are a polyoxyethylene alkylphenyl ether of formula (6)

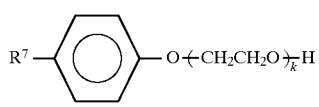

wherein $R^7$ is a straight or branched hydrocarbon chain having 6 to 14 carbon atoms, and k is an integer of 5 to 20;

an acetylene glycol derivative of formula (7),

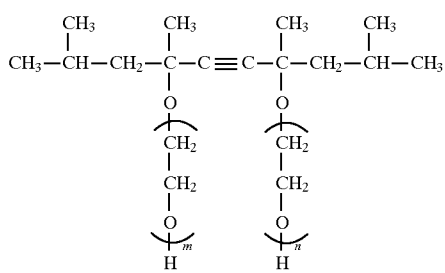

wherein m and n are each an integer of 0 to 20;

a polyoxyethylene alkyl ether compound of formula (8),

wherein $R^8$ is a straight or branched hydrocarbon chain having 6 to 14 carbon atoms, and n is an integer of 5 to 20; and a polyoxyethylene polyoxypropylene alkyl ether compound of formula (9),

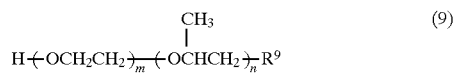

wherein $R^9$ is a straight or branched hydrocarbon chain having 6 to 14 carbon atoms, m and n are each an integer of 0 to 20, provided that m and n cannot be 0 (zero) at the same time.

In the above-mentioned formulae (6), (8) and (9), the hydrocarbon chain represented by $R^7$, $R^8$ or $R^9$ is, for example, an alkyl group or an alkenyl group.

By the addition of the above-mentioned nonionic surfactants to the ink composition, the surface tension of the ink composition can be decreased to 50 mN/m or less, and therefore the wettability of the image receiving medium such as plain paper by the ink composition is increased, so that the penetrating performance of the ink composition into the image receiving medium can be increased, and the drying characteristics of the recorded images can be improved. Therefore, when printing is performed, for instance, on a sheet of plain paper, the drying rate of the printed images is high. As a result, sharp images can be produced on the image receiving medium without spreading of the ink composition.

When the above-mentioned nonionic surfactant having a polyoxyalkylene group is used in combination with the polymeric dye having a weight average molecular weight in the range of 5,000 to 15,000, the dispersion stability of the polymeric dye is significantly improved by the polymeric dye being made soluble by the polyoxyethylene chain of the nonionic surfactant, so that a recording ink composition with excellent storage stability can be obtained, by which ink jet printing can be performed with high ink ejection reliability when the printing operation is performed even after prolonged storage of the ink composition.

Furthermore, when urea and/or a urea derivative such as hydroxyethyl urea or dihydroxyethyl urea is used in combination with the above-mentioned nonionic surfactants, the interaction between the polymeric dye and the nonionic surfactant is weakened, and the association of the molecules of the polymeric dye is loosened, whereby the penetrating performance of the ink composition into the image receiving medium can be improved, and the ejection stability and extended preservation stability of the ink composition can be significantly improved.

It is preferable that urea or the above-mentioned derivatives thereof be added to the ink composition in an amount in the range of 0.1 to 5 wt. % of the entire weight of the ink composition in order to obtain the above-mentioned effect thereof sufficiently, without changing the viscosity of the ink composition even when water is evaporated from the aqueous ink composition.

In the recording ink composition of the present invention, the above-mentioned components are dispersed or dissolved in water. The recording ink composition of the present invention further comprises a water-soluble organic solvent so as to prevent the ink composition from drying during the storage thereof, to improve the solubility stability of the colorant and the surfactant in the ink composition, and to obtain the physical properties of the ink composition as desired.

Examples of the water-soluble organic solvent for use in the present invention include polyhydric alcohols such as ethylene glycol, diethylene glycol, triethylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, and 3-methyl-pentane-1,3,5-triol; alkyl ethers derived from polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers derived from polyhydric alcohols such as ethylene glycol monophenyl ether, and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, and N,N-dimethylformamide; amines such as monoethanol amine, diethanol amine, triethanol amine, monoethylamine, diethyl amine, and triethyl amine; sulfur-containing compounds such as dimethyl sulfoxide, sulfolane, and thiodiethanol; propylene carbonate; ethylene carbonate; and γ-butyrolactone.

Those water-soluble organic solvents may be used alone or in combination.

Of those water-soluble organic solvents, there are preferably employed diethylene glycol, thiodiethanol, polyethylene glycol (200 to 600), triethylene glycol, glycerol, 1,2,6-hexanetriol, 1,2,4-butanetriol, 3-methytlpentane-1,3,5-triol, 1,5-pentanediol, N-methyl-2-pyrrolidone, N-hydroxyethyl-2-pyrrolidone, 2-pyrrolidone and 1,3-dimethylimidazolidinone.

By using such a water-soluble organic solvent, not only the solubility stability of the colorant and the surfactant can be improved, but also the evaporation of water component for use in the ink composition can be prevented. Therefore, even after prolonged storage of the ink composition, or prolonged intermission of printing operation, the ink-jet printing can be resumed with stable ink ejection performance.

In particular, when a pyrrolidone derivative such as N-hydroxyethyl-2-pyrrolidone is added to the recording ink composition, the dispersion stability of the colorant, particularly the dispersion stability of the pigment, can be improved, thereby enhancing the preservation stability of the ink composition. Further, the affinity of the ink composition for the image receiving medium can be increased. Therefore, the ink ejection can be stably resumed even after the ink composition-is allowed to stand without being used for an extended period of time. In addition, it is possible to produce clear images with high image density and uniform dot reproduction on the image receiving medium.

Furthermore, in the present invention, for adjusting the surface tension of the ink composition, the recording ink composition of the present invention may further comprise a surfactant in addition to the above-mentioned anionic surfactants (1) and (2), and nonionic surfactants (4) to (7).

Examples of such surfactants that can be added are alkyl ethers and aryl ethers derived from polyhydric alcohols, such as diethylene glycol monophenyl ether, ethylene glycol monophenyl ether, ethylene glycol monoaryl ether, diethylene glycol monophenyl ether, diethylene glycol monobutyl ether, propylene glycol monobutyl ether, and tetraethylene glycol chlorophenyl ether; polyoxyethylene—polyoxypropylene block copolymer; fluorochemical surfactants; and lower alcohols such as ethanol and 2-propanol. In particular, diethylene glycol monobutyl ether is most preferably employed in the present invention.

With respect to the colorant for use in the recording ink composition, when necessary, other coloring agents may be added to the above-mentioned pigment and polymeric dye.

Examples of such coloring agents include water-soluble dyes with excellent water resistance and light resistance, which can be classified into acid dye, direct dye, basic dye, reactive dye and food dye in accordance with the color index number thereof. These dyes may be added to the recording ink composition of the present invention in such an amount that the water resistance and the light resistance of the recording ink composition are not impaired by the addition of the dyes.

Specific examples of the acid dye and the food dye are:

C.I. Acid Yellow 17, 23, 42, 44, 79, 142;

C.I. Acid Red 1, 8, 13, 14, 18, 26, 27, 35, 37, 42, 52, 82, 87, 89, 92, 97, 106, 111, 114, 115, 134, 186, 249, 254, 289;

C.I. Acid Blue 9, 29, 45, 92, 249;

C.I. Acid Black 1, 2, 7, 24, 26, 94;

C.I. Food Yellow 3, 4;

C.I. Food Red 7, 9, 14; and

C.I. Food Black 1, 2.

Specific examples of the direct dye are:

C.I. Direct Yellow 1, 12, 24, 26, 33, 44, 50, 86, 120, 132, 142, 144;

C.I. Direct Red 1, 4, 9, 13, 17, 20, 28, 31, 39, 80, 81, 83, 89, 225, 227;

C.I. Direct Orange 26, 29, 62, 102;

C.I. Direct Blue 1, 2, 6, 15, 22, 25, 71, 76, 79, 86, 87, 90, 98, 163, 165, 199, 202; and C.I. Direct Black 19, 22, 32, 38, 51, 56, 71, 74, 75, 77, 154, 168, 171.

Specific examples of the basic dye are:

C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91;

C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112;

C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C.I. Basic Black 2, 8.

Specific examples of the reactive dye are:

C.I. Reactive Black 3, 4, 7, 11, 12, 17;

C.I. Reactive Yellow 1, 5, 11, 13, 14, 20, 21, 22, 25, 40, 47, 51, 55, 65, 67;

C.I. Reactive Red 1, 14, 17, 25, 26, 32, 37, 44, 46, 55, 60, 66, 74, 79, 96, 97; and C.I. Reactive Blue 1, 2, 7, 14, 15, 23, 32, 35, 38, 41, 63, 90, 95.

Of the above-mentioned water-soluble dyes, the acid dyes and the direct dyes are particularly preferable for use in the present invention.

In addition to the above, the recording ink composition of the present invention may further comprise conventionally known additives such as an antiseptic agent, a mildewproofing agent, a corrosion inhibitor, a pH adjustor, a chelate reagent, a water-soluble ultraviolet absorbing agent, and a water-soluble infrared absorbing agent.

For instance, sodium dehydroacetate, sodium sorbate, sodium 2-pyridinethiol-1-oxide, sodium benzoate, and sodium pentachlorophenol can be employed as the antiseptic agents and mildewproofing agents.

Examples of the corrosion inhibitor are acid sulfite, sodium thiosulfate, among thiodiglycollic acid, diisopropyl ammonium nitrite, pentaerythritol tetranitrate, and dicyclohexyl ammonium nitrite.

Any material that is capable of adjusting the obtained ink composition to pH 6 or more without having any adverse effect on the ink composition can freely be employed as the pH adjustors in the present invention.

Examples of the pH adjustor for use in the present invention are amines such as diethanolamine and triethanolamine; hydroxides of alkali metals such as lithium hydroxide, sodium hydroxide and potassium hydroxide; other hydroxides such as ammonium hydroxide, quaternary ammonium hydroxide and quaternary phosphonium hydroxide; and carbonates of alkali metals such as lithium carbonate, sodium carbonate, and potassium carbonate.

Examples of the chelate reagent for use in the recording ink composition of the present invention include sodium ethylene diamine tetraacetate, sodium nitrilotriacetate, sodium hydroxyethyl ethylene diamine triacetate, sodium diethylene triamine pentaacetate, and sodium uramil diacetate.

It is preferable that the ink composition be adjusted to pH 6 or more, more preferably in the range of pH 6 to pH 11 in order to improve the preservation stability of the ink composition. When the ink composition is adjusted to pH 6 or more, ink-jet printing can be stably carried out without clogging of the nozzle, for example, even after the ink composition is allowed to stand in an ink cartridge of the ink-jet printer.

When the anionic surfactant of formula (2) is added to the ink composition, it is preferable to adjust the obtained ink composition in the pH range of 6 to 9. This is because the surfactant is easily decomposed, thereby changing the physical properties of the ink composition during the storage of the ink composition if the pH of the ink composition exceeds 9.

According to the present invention, color images can be recorded on an image-receiving medium, by ejecting the previously mentioned recording ink composition of the present invention in the form of droplets with a weight of 10 ng to 160 ng by the application of thermal or mechanical energy thereto, for instance, from a nozzle with an ejection diameter of 20 to 60 $\mu$m at an ejection speed of 5 to 20 m/s. Thus, the color images with sufficient water resistance and light resistance, excellent color reproduction, sufficient sharpness and high resolution can be formed on the image receiving medium, in particular, a sheet of plain paper with a Stöckigt size degree (as defined in the Japanese Industrial Standards P-8122) of 3 seconds or more.

In this case, it is preferable that the deposition amount of the ink composition be in the range of 2 g/m² to 25 g/m². When the deposition amount of the ink composition is within the above range, the image receiving paper can be prevented from being subjected to curling or waving, which will be caused by absorption of water component by the image receiving paper, and the sufficient image density can be ensured.

Particularly, when the ink composition of the present invention is deposited on an image receiving medium with a Stöckigt size degree of 3 seconds or more in a deposition amount of 2.0 to 20 g/m², color images can be formed with a resolution of as high as 10 dot/mm×10 dot/mm or more.

Most of copy papers and other recording papers used in offices have a pH of 5 to 6. On those papers, there can be formed color images with excellent water resistance and light resistance, improved color reproduction and sharpness and high resolution by the ink-jet printing method using the recording ink composition according to the present invention.

Furthermore, the recording ink composition of the present invention can also be used for the formation of images with high transparency on a transparent sheet for use with an overhead projector (OHP).

Other features of this invention will become apparent in the course of the following description of exemplary embodiments, which are given for illustration of the invention and are not intended to be limiting thereof.

EXAMPLE 1-1

10 parts by weight of carbon black which was subjected to plasma treatment so as to make the surface thereof hydrophilic and to have a HLB value of 11, and 0.8 parts by weight of a styrene—acrylic acid copolymer serving as a dispersing agent were dispersed in 89.2 parts by weight of deionized water in an ultrasonic homogenizer, whereby an aqueous dispersion of carbon black particles with a particle diameter of 0.1 μm or less was obtained.

By using this aqueous dispersion of carbon black particles, a mixture of the components shown in the following formulation was prepared and stirred, thereby dissolving the solid components thereof, and the pH of the mixture was adjusted to 8.5 by adding thereto a 10% aqueous solution of lithium hydroxide.

This mixture was then filtered through a 0.45 μm Teflon filter, whereby an ink composition No. 1-1 of the present invention with the following formulation was prepared:

|  | wt. % |
| --- | --- |
| Carbon black (HLB value = 11) (subjected to plasma treatment so as to make the surface thereof hydrophilic) | 5 |
| Polymeric dye (d) in TABLE 1 | 0.1 |
| Styrene - acrylic acid copolymer (dispersing agent) | 0.4 |
| Glycerol | 5 |
| N-hydroxyethyl pyrrolidone | 5 |
| Anionic surfactant (1-1) in TABLE 5 $CH_3(CH_2)_{12}O(CH_2CH_2O)_3CH_2COOH$ | 0.5 |
| Nonionic surfactant Polyoxyethylene alkylphenyl | 1.5 |

-continued

|  | wt. % |
| --- | --- |
| ether of formula (6) 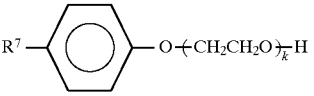 ($R^7$ is $C_{10}H_{21}$— and k is 18) | |
| Sodium dehydroacetate | 0.2 |
| Deionized water | Balance |

EXAMPLE 1-2

2.4 parts by weight of C.I. Pigment Yellow 17 having a HLB value of 14, and 0.1 parts by weight of sodium alginate serving as a dispersing agent were dispersed in 97.5 parts by weight of deionized water in an ultrasonic homogenizer, whereby an aqueous dispersion of C.I. Pigment Yellow 17 particles with a particle diameter of 0.1 μm or less was obtained.

By using this aqueous dispersion of C.I. Pigment Yellow 17 particles, a mixture of the components shown in the following formulation was prepared and stirred, thereby dissolving the solid components thereof, and the pH of the mixture was adjusted to 8.8 by adding thereto a 10% aqueous solution of sodium hydroxide.

The mixture was then filtered through a 0.45 μm membrane filter, whereby an ink composition No. 1-2 of the present invention with the following formulation was prepared:

|  | wt. % |
| --- | --- |
| C.I. Pigment Yellow 17 (HLB = 14) | 1.2 |
| Polymeric dye (c) in TABLE 1 | 0.6 |
| 1,2,6-hexanetriol | 4 |
| 1,5-pentanediol | 8 |
| N-methyl-2-pyrrolidone | 8 |
| Anionic surfactant (2–1) in TABLE 5 | 1.2 |
| 25% aqueous solution of hydroxide (3–1) in TABLE 7 | 0.8 |
| Sodium alginate (dispersing agent) | 0.05 |
| Sodium 2-pyridinethiol-1-oxide | 0.2 |
| Deionized water | Balance |

EXAMPLE 1-3

2 parts by weight of C.I. Pigment Red having a HLB value of 13, and 1 part by weight of a styrene—acrylic acid copolymer serving as a dispersing agent were dispersed in 97 parts by weight of deionized water in an ultrasonic homogenizer, whereby an aqueous dispersion of C.I. Pigment Red 122 particles with a particle diameter of 0.1 μm or less was obtained.

By using this aqueous dispersion of C.I. Pigment Red 122 particles, a mixture of the components shown in the following formulation was prepared and stirred, thereby dissolving the solid components thereof, and the pH of the mixture was adjusted to 8.5 by adding thereto a 10% aqueous solution of lithium hydroxide.

This mixture was then filtered through a 0.45 μm Teflon filter, whereby an ink composition No. 1-3 of the present invention with the following formulation was prepared:

|  | wt. % |
| --- | --- |
| C.I. Pigment Red 122 (HLB = 13) | 1 |
| Polymeric dye (b) in the form of the free acid in TABLE 1 | 0.5 |
| Diethylene glycol | 5 |
| Glycerol | 5 |
| N-hydroxyethyl pyrrolidone | 10 |
| Styrene - acrylic acid copolymer (dispersing agent) | 0.5 |
| Nonionic surfactant Polyoxyethylene alkylphenyl ether of formula (6) | 2 |

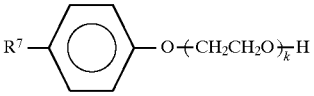

| ($R^7$ is $C_9H_{19}-$ and k is 12) | |
| --- | --- |
| 25% aqueous solution of hydroxide (3-3) in TABLE 7 | 0.2 |
| Sodium dehydroacetate | 0.2 |
| Deionized water | Balance |

EXAMPLE 1-4

2 parts by weight of copper phthalocyanine having a HLB value of 14, and 2 parts by weight of a polyoxyethylene—polyoxypropylene block copolymer serving as a dispersing agent were dispersed in 96 parts by weight of deionized water in an ultrasonic homogenizer, whereby an aqueous dispersion of the copper phthalocyanine particles with a particle diameter of 0.1 μm or less was obtained.

By using this aqueous dispersion of the copper phthalocaynine particles, a mixture of the components shown in the following formulation was prepared and stirred, thereby dissolving the solid components thereof, and the pH of the mixture was adjusted to 9.5 by adding thereto a 10% aqueous solution of lithium hydroxide.

This mixture was then filtered through a 0.45 μm Teflon filter, whereby an ink composition No. 1-4 of the present invention with the following formulation was prepared:

|  | wt. % |
| --- | --- |
| Copper phthalocyanine (HLB = 14) | 1.0 |
| Polymeric dye (d) in TABLE 1 | 1.2 |
| Ethylene glycol | 5 |
| Glycerol | 2 |
| 1,5-pentanediol | 8 |
| 2-pyrrolidone | 2 |
| Polyoxyethylene - polyoxypropylene block copolymer (dispersing agent) | 1 |
| Nonionic surfactant Polyoxyethylene polyoxypropylene alkyl ether compound of formula (9) | 0.8 |

$$H-(OCH_2CH_2)_m-(OCHCH_2)_n-R^9 \quad (9)$$
$$\phantom{H-(OCH_2CH_2)_m-(OCH}|\phantom{CH_2)_n-R^9}$$
$$\phantom{H-(OCH_2CH_2)_m-(O}CH_3$$

| ($R^9 = C_{12}H_{25}-$, m = 20, n = 20) | |
| --- | --- |
| 25% aqueous solution of hydroxide (3-4) in TABLE 7 | 2 |
| Urea | 5 |
| Sodium benzoate | 0.2 |
| Deionized water | Balance |

EXAMPLE 1-5

2.4 parts by weight of Rhodamine B aluminum chelate pigment having a HLB value of 15, and 4 parts by weight of a nonionic surfactant (polyoxyethylene alkyl ether compound of formula (8)) shown in the following formulation, serving as a dispersing agent, were dispersed in 93.6 parts by weight of deionized water in an ultrasonic homogenizer, whereby an aqueous dispersion of the Rhodamine B aluminum chelate pigment particles with a particle diameter of 0.1 μm or less was obtained.

By using this aqueous dispersion of the Rhodamine B aluminum chelate pigment particles, a mixture of the components shown in the following formulation was prepared and stirred, thereby dissolving the solid components thereof, and the pH of the mixture was adjusted to 7.8 by adding thereto a 10% aqueous solution of sodium hydroxide.

The mixture was then filtered through a 0.45 μm Teflon filter, whereby an ink composition No. 1-5 of the present invention with the following formulation was prepared:

|  | wt. % |
| --- | --- |
| Rhodamine B aluminum chelate pigment (HLB = 15) | 1.2 |
| Polymeric dye (a) in the form of the free acid in TABLE 1 | 0.5 |
| Triethylene glycol | 5 |
| 3-methylpentane-1,3,5-triol | 10 |
| N-methyl-2-pyrrolidone | 5 |
| Nonionic surfactant (dispersing agent) Polyoxyethylene alkyl ether compound of formula (8) | 2 |

$$R^8-(OCH_2CH_2)_n-OH \quad (8)$$

| ($R^8 = (C_6H_{12})_2CH-$, n = 12) | |
| --- | --- |
| 25% aqueous solution of hydroxide (3-2) in TABLE 7 | 1.5 |
| Hydroxyethyl urea | 5 |
| Sodium 2-pyridinethiol-1-oxide | 0.2 |
| Deionized water | Balance |

EXAMPLE 1-6

3 parts by weight of a metal-free phthalocyanine having a HLB value of 13, and 2 parts by weight of Nonionic surfactant 1 shown in the following formulation were dispersed in 95 parts by weight of deionized water in an ultrasonic homogenizer, whereby an aqueous dispersion of the metal-free phthalocyanine particles with a particle diameter of 0.1 μm or less was obtained.

By using this aqueous dispersion of the metal-free phthalocyanine particles, a mixture of the components shown in the following formulation was prepared and stirred, thereby dissolving the solid components thereof, and the pH of the mixture was adjusted to 8 by adding thereto a 10% aqueous solution of lithium hydroxide.

The mixture was then filtered through a 0.45 μm Teflon filter, whereby an ink composition No. 1-6 of the present invention with the following formulation was prepared:

|  | wt. % |
| --- | --- |
| Metal-free phthalocyanine (HLB = 13) | 1.5 |
| Polymeric dye (d) in the form of the free acid in TABLE 1 | 1.5 |
| 2-pyrrolidone | 8 |
| Glycerol | 7 |
| Nonionic surfactant 1 Acetylene glycol derivative of formula (7) | 1 |

-continued

|  | wt. % |
|---|---|

$$CH_3-CH-CH_2-\underset{\underset{\underset{\underset{H}{\overset{|}{\overline{\phantom{O}}}}_m}{\overset{|}{CH_2}}}{\overset{|}{\underset{|}{\overset{|}{O}}}}}{\overset{CH_3}{\underset{|}{C}}}-C\equiv C-\underset{\underset{\underset{\underset{H}{\overset{|}{\overline{\phantom{O}}}}_n}{\overset{|}{CH_2}}}{\overset{|}{\underset{|}{\overset{|}{O}}}}}{\overset{CH_3}{\underset{|}{C}}}-CH_2-CH-CH_3 \quad (7)$$

(m = 20, n = 20)
Nonionic surfactant 2     1
Acetylene glycol derivative
of formula (7)

$$CH_3-CH-CH_2-\underset{\underset{\underset{\underset{H}{\overset{|}{\overline{\phantom{O}}}}_m}{\overset{|}{CH_2}}}{\overset{|}{\underset{|}{\overset{|}{O}}}}}{\overset{CH_3}{\underset{|}{C}}}-C\equiv C-\underset{\underset{\underset{\underset{H}{\overset{|}{\overline{\phantom{O}}}}_n}{\overset{|}{CH_2}}}{\overset{|}{\underset{|}{\overset{|}{O}}}}}{\overset{CH_3}{\underset{|}{C}}}-CH_2-CH-CH_3 \quad (7)$$

(m = 10, n = 10)
| | |
|---|---|
| 25% aqueous solution of hydroxide (3-7) in TABLE 7 | 2 |
| Hydroxyethyl urea | 5 |
| Sodium dehydroacetate | 0.2 |
| Deionized water | Balance |

EXAMPLE 1-7

2.4 parts by weight of C.I. Pigment Red 122 having a HLB value of 13, and 4 parts by weight of a nonionic surfactant shown in the following formulation serving as a dispersing agent, were dispersed in 93.6 parts by weight of deionized water in an ultrasonic homogenizer, whereby an aqueous dispersion of C.I. Pigment Red 122 particles with a particle diameter of 0.1 μm or less was obtained.

By using this aqueous dispersion of the C.I. Pigment Red 122 particles, a mixture of the components shown in the following formulation was prepared and stirred, thereby dissolving the solid components thereof, and the pH of the mixture was adjusted to 8 by adding thereto a 10% aqueous solution of lithium hydroxide.

This mixture was then filtered through a 0.45 μm Teflon filter, whereby an ink composition No. 1-7 of the present invention with the following formulation was prepared:

| | wt. % |
|---|---|
| C.I. Pigment Red 122 (HLB = 13) | 1.2 |
| Polymeric dye (a) in TABLE 1 | 0.3 |
| Polymeric dye (c) in TABLE 1 | 0.8 |
| N-methyl-2-pyrrolidone | 8 |
| 1,5-pentanediol | 8 |
| Nonionic surfactant (dispersing agent) Polyoxyethylene polyoxypropylene alkyl ether compound of formula (9) | 2 |

|  | wt. % |
|---|---|

$$H-(OCH_2CH_2)_m-(OCHCH_2)_n-R^9 \quad (9)$$
$$\phantom{H-(OCH_2CH_2)_m-(OCHCH_2}\underset{CH_3}{|}$$

($R^9 = C_{12}H_{25}-$, m = 18, n = 6)
| | |
|---|---|
| Sodium benzoate | 0.5 |
| Deionized water | Balance |

Comparative Example 1-1

The procedure for preparation of the ink composition No. 1-1 in Example 1-1 was repeated except that the polymeric dye (d) in the formulation of the ink composition No. 1-1 in Example 1-1 was replaced by C.I. Acid Blue 249, whereby a comparative ink composition No. 1-1 was prepared.

Comparative Example 1-2

The procedure for preparation of the ink composition No. 1-2 in Example 1-2 was repeated except that the C.I. Pigment Yellow 17 and the polymeric dye (c) in the formulation of the ink composition No. 1-2 in Example 1-2 were replaced by C.I. Acid Yellow 23 in the same amount as the total of C.I. Pigment Yellow 17 and the polymericdye (c), whereby a comparative ink composition No. 1-2 was prepared.

Comparative Example 1-3

The procedure for preparation of the ink composition No. 1-4 in Example 1-4 was repeated except that the copper phthalocyanine and the polymeric dye (d) in the formulation of the ink composition No. 1-4 in Example 1-4 were replaced by C.I. Acid Blue 9 in the same amount as the total amount of the copper phthalocyanine and the polymeric dye (d), whereby a comparative ink composition No. 1-3 was prepared.

Comparative Example 1-4

The procedure for preparation of the ink composition No. 1-7 in Example 1-7 was repeated except that the polymeric dye (a) was removed from the formulation of the ink composition No. 1-5 in Example 1-5, whereby a comparative ink composition No. 1-4 was prepared.

Comparative Example 1-5

The procedure for preparation of the ink composition No. 1-7 in Example 1-7 was repeated except that C.I. Pigment Red 122 and the polymeric dye (a) in the formulation of the ink composition No. 1-7 in Example 1-7 were replaced by C.I. Direct Red 9 in the same amount as the total amount of C.I. Pigment Red 122 and the polymeric dye (a), and that lithium hydroxide was replaced by ammonium hydroxide for adjusting pH of the ink composition to 8, whereby a comparative ink composition No. 1-5 was prepared.

Each of the ink compositions Nos. 1-1 to 1-7 according to the present invention and the comparative ink compositions Nos. 1-1 to 1-5 was subjected to the following evaluation tests:

(1) Image Clearness Inspection Test

Each recording ink composition was separately filled into (i) a thermal ink-jet printer with a head having 300 dpi nozzles with a nozzle diameter of 45 μm, and (ii) an ink-jet printer with a head having 128 dpi nozzles with a nozzle diameter of 33 μm, capable of ejecting the ink composition therefrom by the application of pressure thereto by the action of a piezoelectric element of PZT.

In this test, ink jet printing was conducted on three kinds of papers, that is, commercially available recycled paper, high quality paper, and bond paper. The image quality of the printed images was evaluated by visual inspection from the viewpoints of the image blurring, the blurring at the boundaries of two-color superimposed portions, the color tone and the image density.

The results are shown in TABLE 8-1, in which symbols, ○, Δ and x, respectively denote as follows:

○: high quality images were formed on all of the three kinds of papers;

Δ: satisfactory image quality was obtained on at least one kind of paper; and x: the image quality was unsatisfactory on any of the three kinds of papers.

(2) Image Formation Test on PET Film

Using each ink composition, images were formed on a polyethylene terephthalate (PET) film provided with an overcoat layer comprising as the main component PVA.

The images formed on the PET film were projected onto a screen using an overhead projector to evaluate the color development performance.

The results are shown in TABLE 1 in which symbols, ○, Δ and x, respectively denote as follows:

○: the transparency of the obtained color images was very high, and color development of two-color superimposed portions and single color portion was excellent;

Δ: the color development of single color portions was excellent, but the color development of two-color superimposed portions was slightly dull; and x: the color development was no good in both single color portions and two-color superimposed portions.

(3) Water Resistance Inspection Test

A printed-image-bearing sample was prepared by printing images on the above-mentioned three kinds of papers using each of the recording ink compositions. Each printed-image-bearing sample was immersed into water at 30° C. for one minute, and the image densities of the printed image were measured by use of a McBeth densitometer before and after water immersion. The water resistance of the image obtained by each aqueous ink composition was determined in terms of the fading ratio by percentage in accordance with the following formula:

$$\frac{\text{Fading}}{\text{Ratio}(\%)} = \left[ 1 - \frac{\text{I.D. after water immersion}}{\text{I.D. before water immersion}} \right] \times 100$$

The results are shown in TABLE 8-1, in which symbols, ○, Δ and x, respectively denote as follows:

○: the fading ratio was less than 10%, that is, the fading ratio<10%, with all of the three kinds of papers;

Δ, the fading ratio was not less than 10%, but less than 30%, that is, 10%≦the fading ratio<30%, with any of the three kinds of papers; and x: the fading ration was not less than 30%, that is, the fading ratio≧30%, with any of the three kinds of papers.

(4) Light Resistance Inspection Test

A printed-image-bearing sample obtained by use of each of the above recording ink compositions was exposed to the light of a xenon fade meter at a black panel temperature of 63 degrees for 3 hours. The image density before the exposure and that after the exposure were measured by use of a Macbeth densitometer, and the light resistance obtained by each of the ink compositions was determined in terms of the fading ratio by percentage in accordance with the following formula:

$$\frac{\text{Fading}}{\text{Ratio}(\%)} = \left[ 1 - \frac{\text{I.D. after the exposure}}{\text{I.D. before the exposure}} \right] \times 100$$

The results are shown in TABLE 8-1, in which symbols, ○, Δ and x, respectively denote as follows:

○: the fading ratio was less than 5%, that is, the fading ratio<5%, with all of the three kinds of papers;

Δ: the fading ratio was not less than 5%, but less than 30%, that is, 5%≦the fading ratio<30%, with any of the three kinds of papers; and x: the fading ration was not less than 30%, that is, the fading ratio≧30%, with any of the three kinds of papers.

(4) Drying Characteristics Inspection Test

A sheet of filter paper was brought into pressure contact with the printed image immediately after the images were printed on the above-mentioned three kinds of papers. The drying characteristics of the ink compositions were expressed by the length of time from the contact of the filter paper with the printed images until no more images were transferred to the filter paper.

The results are shown in TABLE 8-1, in which symbols, ○ and x, respectively denote as follows:

○: the printed image was dried within 10 seconds on all the three kinds of papers; and x: the printed image was not dried within 10 seconds on any of the three kinds of papers, and more time was required before the printed image becomes dried.

(5) Preservation Stability Test

Four samples of each ink composition were separately placed in a polyethylene container, and allowed to stand at −20° C., 5° C., 20° C. and 70° C. for three months. After the storage of three months, the presence or absence of a precipitate in each sample was visually inspected, and the changes in the physical properties such as the surface tension and viscosity were inspected.

The results are shown in TABLE 8-1, in which symbols, ○, Δ and x, respectively denote as follows:

○: no changes in the physical properties were observed and no precipitates were formed under any of the above-mentioned preservation temperature conditions;

Δ: significant changes in the physical properties were observed, although the formation of precipitates was not observed under any of the above-mentioned preservation temperature conditions; and x: the formation of precipitates were observed under all of the above-mentioned preservation temperature conditions.

(6) Ink-ejection Performance Reliability Test

Each ink composition was filled into an ink-jet printer with 128 dpi nozzles capable of ejecting the ink composition therefrom by the application of pressure thereto by the action of a piezoelectric element of PZT.

Printing was continuously carried out without capping the printer head. After some intermission, printing was resumed without cleaning the nozzles. At this moment, the ink-ejecting reliability of each ink composition was evaluated by a permissible intermission time or decapping time (sec.), namely, the time from starting by the printing operation with the nozzles being decapped until the direction in which the ink composition was ejected from one of the decapped nozzles was deviated from its original direction, or by the changes in the weight of the ejected ink droplets. The longer the permissible time, the higher the reliability. The results are shown in TABLE 8-1, in which symbols, ○, Δ and x, respectively denote as follows:

○: there was no problem even after an intermission of 600 seconds;

Δ: there were slight changes in the weight of the ejected ink droplet and in the ink-ejecting direction after the intermission of 600 seconds.

x: the nozzles were considerably clogged with the ink composition after the intermission of 600 seconds or less.

TABLE 8-1

|  | Image Clearness | Water Resistance of Images | Light Resistance of Images | Drying Characteristics of Images | Preservation Stability of Ink | Reliability of Ink-ejection Performance | Suitability for OHP |
|---|---|---|---|---|---|---|---|
| Ex. 1-1 | ○ | ○ | ○ | ○ | ○ | ○ | ○ |
| Ex. 1-2 | ○ | ○ | ○ | ○ | ○ | ○ | ○ |
| Ex. 1-3 | ○ | ○ | ○ | ○ | ○ | ○ | ○ |
| Ex. 1-4 | ○ | ○ | ○ | ○ | ○ | ○ | ○ |
| Ex. 1-5 | ○ | ○ | ○ | ○ | ○ | ○ | ○ |
| Ex. 1-6 | ○ | ○ | ○ | ○ | ○ | ○ | ○ |
| Ex. 1-7 | ○ | ○ | ○ | ○ | ○ | ○ | ○ |
| Comp. Ex. 1-1 | Δ(*) | x | ○ | ○ | ○ | ○ | Δ |
| Comp. Ex. 1-2 | ○ | x | ○ | ○ | ○ | ○ | ○ |
| Comp. Ex. 1-3 | x | ○ | x | ○ | Δ | ○ | ○ |
| Comp. Ex. 1-4 | Δ(*) | ○ | ○ | ○ | x | Δ | x |
| Comp. Ex. 1-5 | Δ | ○ | x | ○ | Δ | ○ | ○ |

(*) The images spread and were blurred.

As can be seen from the results shown in TABLE 8-1, the recording ink compositions according to the present invention can produce clear color images with excellent color reproduction and high image density without image blurring. In addition, the ink images formed on any of the recording papers are superior in terms of the water resistance, light resistance, and drying characteristics. Furthermore, the preservation stability of the ink compositions according to the present invention is excellent, so that ink-jet printing can be stably carried out with high reliability of ink ejection after a long-term storage or intermission of printing operation.

In contrast to this, recorded images obtained by the comparative ink composition No. 1-1 prepared in Comparative Example 1-1 were poor in clearness due to the spreading of the ink composition and the water resistance of the recorded images was insufficient for use in practice.

Recorded images obtained by the comparative ink composition No. 1-2 prepared in Comparative Example 1-2 were also poor in water resistance.

Recorded images obtained by the comparative ink composition No. 1-3 prepared in Comparative Example 1-3 were poor in clearness and light resistance.

Recorded images obtained by the comparative ink composition No. 1-4 prepared in Comparative Example 1-4 were also poor in clearness due to the spreading of the ink composition, and the preservation stability of the ink composition was no good.

Recorded images obtained by the comparative ink composition No. 1-5 prepared in Comparative Example 1-5 were poor in image clearness and light resistance, and the preservation stability of the ink composition was also poor.

When images were printed on a transparent sheet for use with an overhead projector (OHP), the recording ink compositions of the present invention were capable of producing clear images with high transparency on the transparent sheet. However, the comparative ink compositions prepared in Comparative Examples 1-1 and 1-5 were obviously not suitable for forming ink images on the OHP film.

Example 2-1

10 parts by weight of carbon black which was subjected to plasma treatment so as to make the surface thereof hydrophilic and to have a HLB value of 11, and 0.8 parts by weight of a styrene—acrylic acid copolymer serving as a dispersing agent were dispersed in 89.2 parts by weight of deionized water in an ultrasonic homogenizer, whereby an aqueous dispersion of carbon black particles with a particle diameter of 0.1 $\mu$m or less was obtained.

By using this aqueous dispersion of carbon black particles, a mixture of the components shown in the following formulation was prepared and stirred, thereby dissolving the solid components thereof, and the pH of the mixture was adjusted to 8.5 by adding thereto a 10% aqueous solution of lithium hydroxide.

This mixture was then filtered through a 0.45 $\mu$m Teflon filter, whereby an ink composition No. 2-1 of the present invention with the following formulation was prepared:

|  | wt. % |
|---|---|
| Carbon black (HLB value = 11) (subjected to plasma treatment so as to make the surface thereof hydrophilic) | 5 |
| Polymeric dye (d) in TABLE 1 | 0.1 |
| Styrene - acrylic acid copolymer (dispersing agent) | 0.4 |
| Glycerol | 5 |
| N-hydroxyethyl pyrrolidone | 5 |
| Anionic surfactant (1-1) in TABLE 5 $CH_3(CH_2)_{22}O(CH_2CH_2O)_3CH_2COOH$ | 0.5 |
| Nonionic surfactant | 1.5 |

-continued

| | wt. % |
|---|---|
| Polyoxyethylene alkylphenyl ether of formula (6) | |

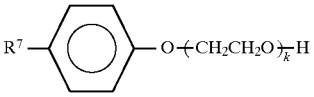

| | |
|---|---|
| ($R^7$ is $C_9H_{19}-$ and k is 18) | |
| Sodium dehydroacetate | 0.2 |
| Deionized water | Balance |

EXAMPLE 2-2

2.4 parts by weight of C.I. Pigment Yellow 17 having a HLB value of 14, and 0.1 parts by weight of sodium alginate serving as a dispersing agent were dispersed in 97.5 parts by weight of deionized water in an ultrasonic homogenizer, whereby an aqueous dispersion of C.I. Pigment Yellow 17 particles with a particle diameter of 0.1 μm or less was obtained.

By using this aqueous dispersion of C.I. Pigment Yellow 17 particles, a mixture of the components shown in the following formulation was prepared and stirred, thereby dissolving the solid components thereof, and the pH of the mixture was adjusted to 8.8 by adding thereto a 10% aqueous solution of sodium hydroxide.

The mixture was then filtered through a 0.45 μm membrane filter, whereby an ink composition No. 1-2 of the present invention with the following formulation was prepared:

| | wt. % |
|---|---|
| C.I. Pigment Yellow 17 (HLB = 14) | 1.2 |
| Polymeric dye (c) in TABLE 1 | 0.6 |
| 1,2,6-hexanetriol | 4 |
| 1,5-pentanediol | 8 |
| N-methyl-2-pyrrolidone | 8 |
| Anionic surfactant (2-1) in TABLE 5 | 1.2 |
| Nonionic surfactant | 1.5 |
| Acetylene glycol derivative of formula (7) | |

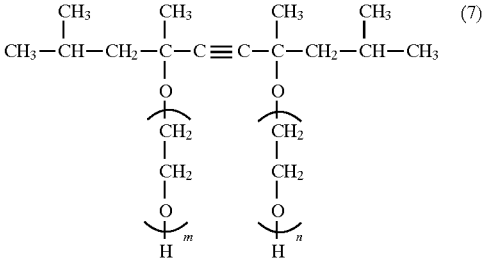

| | |
|---|---|
| (m = 10, n = 10) | |
| 25% aqueous solution of hydroxide (3-1) in TABLE 7 | 0.8 |
| Sodium alginate (dispersing agent) | 0.05 |
| Urea | 5 |
| Sodium 2-pyridinethiol-1-oxide | 0.2 |
| Deionized water | Balance |

Comparative Example 2-1

The procedure for preparation of the ink composition No. 2-1 in Example 2-1 was repeated except that the polymeric dye (d) in the formulation of the ink composition No. 2-1 in Example 2-1 was replaced by C.I. Acid Blue 249, whereby a comparative ink composition No. 2-1 was prepared.

Comparative Example 2-2

The procedure for preparation of the ink composition No. 2-2 in Example 2-2 was repeated except that the C.I. Pigment Yellow 17 and the polymeric dye (c) in the formulation of the ink composition No. 2-2 in Example 2-2 was replaced by C.I. Acid Yellow 23 in the same amount as the total of C.I. Pigment Yellow 17 and the polymeric dye (c), whereby a comparative ink composition No. 2-2 was prepared.

Each of the ink compositions Nos. 2-1 to 2-2 according to the present invention and the comparative ink compositions Nos. 2-1 to 2-2 was subjected to the same evaluation tests as for the above-mentioned ink compositions Nos. 1-1 to 1-7 according to the present invention and the comparative ink compositions Nos. 1-1 to 1-7.

The results are shown in TABLE 8-2

TABLE 8-2

| | Image Clearness | Water Resistance of Images | Light Resistance of Images | Drying Characteristics of Images | Preservation Stability of Ink | Reliability of Ink-ejection Performance | Suitability for OHP |
|---|---|---|---|---|---|---|---|
| Ex. 2-1 | ○ | ○ | ○ | ○ | ○ | ○ | ○ |
| Ex. 2-2 | ○ | ○ | ○ | ○ | ○ | ○ | ○ |
| Comp. Ex. 2-1 | Δ(*) | x | ○ | ○ | ○ | ○ | Δ |
| Comp. Ex. 2-2 | ○ | x | ○ | ○ | ○ | ○ | ○ |

(*) The images spread and were blurred.

As can be seen from the results shown in TABLE 8-2, the recording ink compositions according to the present invention can produce clear color images with excellent color reproduction and high image density without image blurring. In addition, the ink images formed on any of the recording papers are superior in terms of the water resistance, light resistance, and drying characteristics. Furthermore, the preservation stability of the ink compositions according to the present invention is excellent, so that ink-jet printing can be stably carried cut with high reliability of ink ejection after a long-term storage or intermission of printing operation.

In contrast to this, recorded images obtained by the comparative ink composition No. 2-1 prepared in Comparative Example 2-1 were poor in clearness due to the spreading of the ink composition and the water resistance of the recorded images was insufficient for use in practice.

Recorded images obtained by the comparative ink composition No. 2-2 prepared in Comparative Example 2-2 were also poor in water resistance.

EXAMPLE 3-1

4 parts by weight of a quinacridone pigment of formula (P-1-1) in TABLE 2 and 0.8 parts by weight of a styrene—acrylic acid copolymer serving as a dispersing agent were dispersed in 95.2 parts by weight of deionized water in an ultrasonic homogenizer, whereby an Aqueous dispersion of the particles of the quinacridone pigment of formula (P-1-1) with a particle diameter of 0.1 μm or less was obtained.

By using this aqueous dispersion of the particles of the quinacridone pigment of formula (P-1-1), a mixture of the components shown in the following formulation was prepared and stirred, thereby dissolving the solid components thereof, and the pH of the mixture was adjusted to 7.5 by adding thereto a 10% aqueous solution of lithium hydroxide.

This mixture was then filtered through a 0.45 μm Teflon filter, whereby an ink composition No. 3-1 of the present invention with the following formulation was prepared:

| | wt. % |
|---|---|
| Quinacridone pigment of formula (P-1-1) in TABLE 2 | 2 |
| Polymeric dye (PD-1) in TABLE 4 | 4 |
| Styrene - acrylic acid copolymer (dispersing agent) | 0.4 |
| Glycerol | 5 |
| N-hydroxyethyl pyrrolidone | 10 |
| Nonionic surfactant | 2 |
| Polyoxyethylene alkylphenyl ether of formula (6) | |

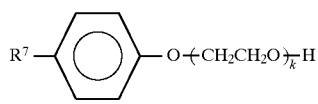

(R$^7$ is C$_9$H$_{19}$— and k is 18)

| | |
|---|---|
| Nonionic surfactant Polyoxyethylene alkylphenyl ether of formula (6) | 1 |

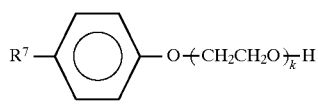

(R$^7$ is C$_9$H$_{19}$— and k is 10)

| | wt. % |
|---|---|
| Sodium dehydroacetate | 0.2 |
| Deionized water | Balance |

EXAMPLE 3-2

2.4 parts by weight of a phthalocyanine pigment of formula (P-2-1) in TABLE 2, and 2 parts by weight of Nonionic surf actant 1 serving as a dispersing agent shown in the following formulation were dispersed in 95.2 parts by weight of deionized water in an ultrasonic homogenizer, whereby an aqueous dispersion of the particles of the phthalocyanine pigment of formula (P-2-1) in TABLE 2 with a particle diameter of 0.1 μm or less was obtained.

By using this aqueous dispersion of the phthalocyanine particles, a mixture of the components shown in the following formulation was prepared and stirred, thereby dissolving the solid components thereof, and the pH of the mixture was adjusted to 6.8 by adding thereto a 10% aqueous solution of sodium hydroxide.

The mixture was then filtered through a 0.45 μm Teflon filter, whereby an ink composition No. 3-2 of the present invention with the following formulation was prepared:

| | wt. % |
|---|---|
| Phthalocyanine pigment of formula (P-2-1) in TABLE 2 | 1.2 |
| Polymeric dye (PD-2) in TABLE 4 | 4 |
| 1,2,6-hexanetriol | 4 |
| 1,5-pentanediol | 8 |
| N-methyl-2-pyrrolidone | 10 |
| Nonionic surfactant 1 Acetylene glycol derivative of formula (7) | 1.2 |

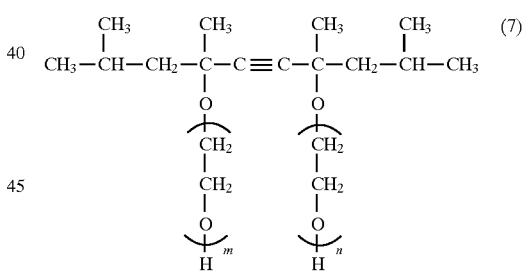

(m = 20, n = 20)

| | |
|---|---|
| Nonionic surfactant 2 Acetylene glycol derivative of formula (7) | 1 |

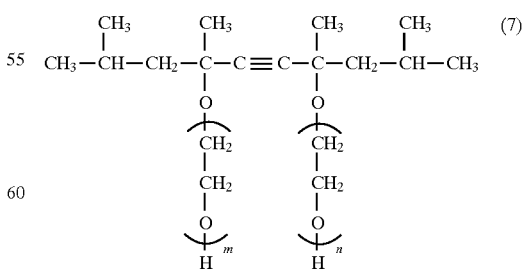

(m = 10, n = 10)

| | |
|---|---|
| Sodium alginate (dispersing agent) | 0.05 |

-continued

| | wt. % |
|---|---|
| Urea | 5 |
| Sodium 2-pyridinethiol-1-oxide | 0.2 |
| Deionized water | Balance |

EXAMPLE 3-3

2 parts by weight of a quinacridone pigment of formula (P-1-2) in TABLE 2, and 1 part by weight of a styrene—acrylic copolymer serving as a dispersing agent shown in the following formulation were dispersed in 97 parts by weight of deionized water in an ultrasonic homogenizer, whereby an aqueous dispersion of the particles of the quinacridone pigment of formula (P-1-2) in TABLE 2 with a particle diameter of 0.1 μm or less was obtained.

By using this aqueous dispersion of the phthalocyanine particles, a mixture of the components shown in the following formulation was prepared and stirred, thereby dissolving the solid components thereof, and the pH of the mixture was adjusted to 8.5 by adding thereto a 10% aqueous solution of lithium hydroxide.

The mixture was then filtered through a 0.45 μm Teflon filter, whereby an ink composition No. 3-3 of the present invention with the following formulation was prepared:

| | wt. % |
|---|---|
| Quinacridone pigment of formula (P-1-2) in TABLE 2 | 1 |
| Polymeric dye (PD-1) in TABLE 4 | 0.5 |
| Titanium oxide particles with a particle size of 0.1 μm | 0.3 |
| Diethylene glycol | 5 |
| Glycerol | 5 |
| N-hydroxyethyl pyrrolidone | 10 |
| Styrene - acrylic acid copolymer (dispersing agent) | 0.5 |
| Nonionic surfactant Polyoxyethylene alkyl ether compound of formula (8) | 2 |
| $R^8\text{---}(OCH_2CH_2)_n\text{---}OH$ (8) | |
| ($R^8 = C_9H_{19}\text{---}$, n = 12) | |
| Sodium dehydroacetate | 0.2 |
| Deionized water | Balance |

EXAMPLE 3-4

2 parts by weight of a phthalocyanine pigment of formula (P-2-3) in TABLE 2, and 1.6 parts by weight of a nonionic surfactant (polyoxyethylene polyoxypropylene alkyl ether compound of formula (9)) serving as a dispersing agent shown in the following formulation were dispersed in 96.4 parts by weight of deionized water in an ultrasonic homogenizer, whereby an aqueous dispersion of the particles of the phthalocyanine pigment of formula (P-2-3) in TABLE 2 with a particle diameter of 0.1 μm or less was obtained.

By using this aqueous dispersion of the phthalocyanine particles, a mixture of the components shown in the following formulation was prepared and stirred, thereby dissolving the solid components thereof, and the pH of the mixture was adjusted to 9.5 by adding thereto a 10% aqueous solution of lithium hydroxide.

The mixture was then filtered through a 0.45 μm Teflon filter, whereby an ink composition No. 3-3 of the present invention with the following formulation was prepared:

| | wt. % |
|---|---|
| Phthalocyanine pigment of formula (P-2-3) in TABLE 2 | 1.0 |
| Polymeric dye (PD-2) in TABLE 4 | 0.5 |
| Ethylene glycol | 5 |
| Glycerol | 2 |
| 1,5-pentanediol | 8 |
| 2-pyrrolidone | 2 |
| Nonionic surfactant (dispersing agent) Polyoxyethylene polyoxypropylene alkyl ether compound of formula (9) | 2 |
| $$H\text{---}(OCH_2CH_2)_m\text{---}(OCHCH_2)_n\text{---}R^9 \quad (9)$$ $$\qquad\qquad\qquad\qquad\quad |$$ $$\qquad\qquad\qquad\qquad\ CH_3$$ | |
| ($R^9 = C_6H_{13}\text{---}$, m = 20, n = 20) | |
| Urea | 5 |
| Sodium benzoate | 0.2 |
| Deionized water | Balance |

EXAMPLE 3-5

1.6 parts by weight of a phthalocyanine pigment of formula (P-2-1) in TABLE 2, 0.4 parts by weight of a phthalocyanine pigment of formula (P-2-4) in TABLE 2, and 4 parts by weight of a nonionic surfactant (polyoxyethylene polyoxypropylene alkyl ether compound of formula (8)) serving as a dispersing agent shown in the following formulation were dispersed in 94 parts by weight of deionized water in an ultrasonic homogenizer, whereby an aqueous dispersion of the particles of the phthalocyanine pigment of formula (P-2-1) and the phthalocyanine pigment of formula (P-2-4) in TABLE 2 with a particle diameter of 0.1 μm or less was obtained.

By using this aqueous dispersion of the phthalocyanine particles, a mixture of the components shown in the following formulation was prepared and stirred, thereby dissolving the solid components thereof, and the pH of the mixture was adjusted to 7.8 by adding thereto a 10% aqueous solution of sodium hydroxide.

The mixture was then filtered through a 0.45 μm Teflon filter, whereby an ink composition No. 3-5 of the present invention with the following formulation was prepared:

| | wt. % |
|---|---|
| Phthalocyanine pigment of formula (P-2-1) in TABLE 2 | 0.8 |
| Phthalocyanine pigment of formula (P-2-4) in TABLE 2 | 0.2 |
| Polymeric dye (PD-2) in TABLE 4 | 3.5 |
| Triethylene glycol | 5 |
| Petriol | 10 |
| N-methyl-2-pyrrolidone | 5 |
| Nonionic surfactant Polyoxyethylene alkyl ether compound of formula (8) | 2 |
| $R^8\text{---}(OCH_2CH_2)_n\text{---}OH$ (8) | |
| ($R^8 = C_9H_{19}\text{---}$, n = 12) | |
| Hydroxyethyl urea | 5 |

-continued

| | wt. % |
|---|---|
| Sodium 2-pyridinethiol-1-oxide | 0.2 |
| Deionized water | Balance |

Comparative Example 3-1

The procedure for preparation of the ink composition No. 3-1 in Example 3-1 was repeated except that the quinacridone pigment of formula (P-1-1) and the polymeric dye (PD-1) in the formulation of the ink composition No. 3-1 in Example 3-1 were replaced by C.I. Acid Red 52 in the same amount as the total amount of the quinacridone pigment of formula (P-1-1) and the polymeric dye (PD-1) in the formulation of the ink composition No. 3-1, whereby a comparative ink composition No. 3-1 was prepared.

Comparative Example 3-2

The procedure for preparation of the ink composition No. 3-2 in Example 3-2 was repeated except that the phthalocyanine pigment of formula (P-2-1) and the polymeric dye (PD-2) in the formulation of the ink composition No. 3-2 in Example 3-2 were replaced by C.I. Acid Blue 249 in the same amount as the total amount of the phthalocyanine pigment of formula (P-2-1) and the polymeric dye (PD-2) in the formulation of the ink composition No. 3-2, whereby a comparative ink composition No. 3-2 was prepared.

Comparative Example 3-3

The procedure for preparation of the ink composition No. 3-3 in Example 3-3 was repeated except that the polymeric dye (PD-1) in the formulation of the ink composition No. 3-3 in Example 3-3 was replaced by C.I. Acid Red, whereby a comparative ink composition No. 3-3 was prepared.

Comparative Example 3-4

The procedure for preparation of the ink composition No. 3-4 in Example 3-4 was repeated except that the phthalocyanine pigment of formula (P-2-3) and the polymeric dye (PD-2) in the formulation of the ink composition No. 3-4 in Example 3-4 were replaced by C.I. Acid Blue 9 in the same amount as the total amount of the phthalocyanine pigment of formula (P-2-3) and the polymeric dye (PD-2) in the formulation of the ink composition No. 3-4, whereby a comparative ink composition No. 3-4 was prepared.

Comparative Example 3-5

The procedure for preparation of the ink composition No. 3-5 in Example 3-5 was repeated except that the polyethylene alkyl ether compound of formula (8) in the formulation of the ink composition No. 3-5 in Example 3-5 was removed therefrom, whereby a comparative ink composition No. 3-5 was prepared.

Each of the ink compositions Nos. 3-1 to 3-5 according to the present invention and the comparative ink compositions Nos. 3-1 to 3-5 was subjected to the same evaluation tests as for the above-mentioned ink compositions Nos. 1-1 to 1-7 according to the present invention and the comparative ink compositions Nos. 1-1 to 1-7.

The results are shown in TABLE 8-3

TABLE 8-3

| | Image Clearness | Water Resistance of Images | Light Resistance of Images | Drying Characteristics of Images | Preservation Stability of Ink | Reliability of Ink-ejection Performance | Suitability for OHP |
|---|---|---|---|---|---|---|---|
| Ex. 3-1 | ○ | ○ | ○ | ○ | ○ | ○ | ○ |
| Ex. 3-2 | ○ | ○ | ○ | ○ | ○ | ○ | ○ |
| Ex. 3-3 | ○ | ○ | ○ | ○ | ○ | ○ | ○ |
| Ex. 3-4 | ○ | ○ | ○ | ○ | ○ | ○ | ○ |
| Ex. 3-5 | ○ | ○ | ○ | ○ | ○ | ○ | ○ |
| Comp. Ex. 3-1 | Δ(*) | x | x | ○ | ○ | ○ | Δ |
| Comp. Ex. 3-2 | Δ(*) | x | ○ | ○ | Δ | ○ | Δ |
| Comp. Ex. 3-3 | Δ(*) | x | x | ○ | ○ | ○ | Δ |
| Comp. Ex. 3-4 | Δ(*) | x | x | ○ | Δ | ○ | Δ |
| Comp. Ex. 3-5 | ○ | ○ | ○ | ○ | x | Δ | x |

(*) The images spread and were blurred.

As can be seen from the results shown in TABLE 8-3, the recording ink compositions according to the present invention can produce clear color images with excellent color reproduction and high image density without image blurring. In addition, the ink images formed on any of the recording papers are superior in terms of the water resistance, light resistance, and drying characteristics. Furthermore, the preservation stability of the ink compositions according to the present invention is excellent, so that ink-jet printing can be stably carried out with high reliability of ink ejection after a long-term storage or intermission of printing operation.

In contrast to this, recorded images obtained by the comparative ink composition No. 3-1 prepared in Comparative Example 3-1 were poor in clearness due to the spreading of the ink composition, and the water resistance and light resistance of the recorded images were insufficient for use in practice.

Recorded images obtained by the comparative ink composition No. 3-2 prepared in Comparative Example 3-2 were also poor in clearness and water resistance. The preservation stability of the comparative ink composition No. 3-2 was also poor.

Recorded images obtained by the comparative ink composition No. 3-3 prepared in Comparative Example 3-3 were also poor in clearness, water resistance and light resistance.

Recorded images obtained by the comparative ink composition No. 3-4 prepared in Comparative Example 3-4 were poor in clearness, water resistance and light resistance. The preservation stability of the comparative ink composition No. 3-4 was also poor.

The preservation stability and the reliability of ink ejection performance of the comparative ink composition No. 3-5 prepared in Comparative Example 3-4 were poor.

The recording ink compositions of the present invention were capable of producing clear images with high transparency on the transparent sheet. However, the comparative ink compositions prepared in Comparative Examples 3-1 to 3-5 were not suitable for forming ink images on the OHP film.

As previously mentioned, the recording ink composition according to the present invention has excellent color tone, and is capable of producing clear images with excellent color reproduction and sufficient water resistance and light resistance. In addition, the color reproduction of two-color superimposed image portions is excellent, and ink images with excellent transparency can be formed on a transparent sheet for use with the OHP.

According to the present invention, the drying characteristics of the ink image formed on a sheet of plain paper can be improved, and at the same time, the image blurring can be prevented, whereby clear images can be obtained.

Furthermore, since the preservation stability of the recording ink composition according to the present invention is excellent, the reliability of ink-ejection performance can be maintained after a long-term storage of the ink composition.

According to the ink-jet printing method using the above-mentioned recording ink composition of the present invention, there can be formed on an image receiving medium clear color images with excellent color reproduction and high water resistance and light resistance. Therefore, the resolution of the obtained image can be increased.

Japanese Patent Application No. 8-219339 filed Aug. 1, 1996, Japanese Patent Application No. 8-227600 filed Aug. 8, 1996 and Japanese Patent Application No. 9-44792 filed Feb. 13, 1997 are hereby incorporated by reference.

What is claimed is:

1. A recording ink composition comprising:
a colorant comprising a pigment which is soluble or dispersible in water, and a polymeric dye having a weight average molecular weight in a range of 5,000 to 15,000,
a dispersant comprising at least one dispersant component selected from the group consisting of at least one polymeric compound having a hydrophilic moiety and a hydrophobic moiety, and/or at least one surfactant having an alkyl group having S or more carbon atoms,
water, and
a water-soluble organic solvent.

2. The recording ink composition as claimed in claim 1, wherein said pigment is in the form of particles having a particle diameter in a range of 0.01 μm to 0.1 μm.

3. The recording ink composition as claimed in claim 1, wherein at least one of said surfactants having an alkyl group having 5 or more carbon atoms is selected from the group consisting of:

a polyoxyethylene alkyl ether acetate of formula (1),

wherein $R^1$ is a straight chain or branched alkyl group having 6 to 14 carbon atoms, $M^+$ is a cation selected from the group consisting of alkali metal cation, quaternary ammonium cation, quaternary phosphonium cation, and alkanol amine cation, and m is an integer of 3 to 12; and a dialkylsulfosuccinate of formula (2),

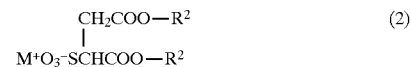

wherein $R^2$ is a branched alkyl group having 5 to 7 carbon atoms, and $M^+$ is a cation selected from the group consisting of alkali metal cation, quaternary ammonium cation, quaternary phosphonium cation, and alkanol amine cation.

4. The recording ink composition as claimed in claim 1, wherein at least two of said surfactants having an alkyl group having 5 or more carbon atoms are:

a polyoxyethylene alkyl ether acetate of formula (1),

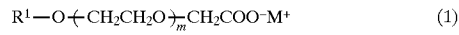

wherein $R^1$ is a straight chain or branched alkyl group having 6 to 14 carbon atoms, $M^+$ is a cation selected from the group consisting of alkali metal cation, quaternary ammonium cation, quaternary phosphonium cation, and alkanol amine cations and m is an integer of 3 to 12; and a dialkylsulfosuccinate of formula (2),

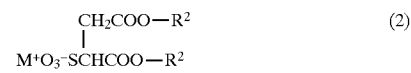

wherein $R^2$ is a branched alkyl group having 5 to 7 carbon atoms, and $M^+$ is a cation selected from the group consisting of alkali metal cation, quaternary ammonium cation, quaternary phosphonium cation, and alkanol amine cation.

5. The recording ink composition as claimed in claim 3, wherein, in formulae (1) and (2), said alkali metal cation represented by $M^+$ is selected from the group consisting of $Na^+$ and $Li^+$; said quaternary ammonium cation represented by $M^+$ is represented by formula (3):

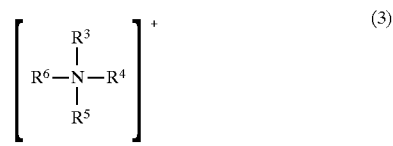

wherein $R^3$ to $R^6$ each is selected from the group consisting of a hydrogen atom, an alkyl group having 1 to 4 carbon atoms, and a halogenated alkyl group having 1 to 4 carbon atoms; said alkanolamine cation represented by $M^+$ is a cation represented by formula (4):

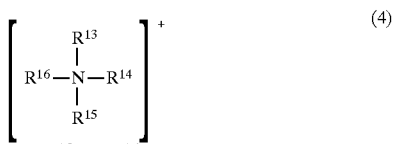

wherein at least one of $R^{13}$ to $R^{14}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms; and said quaternary phosphonium cation represented by M⁺ is a cation represented by formula (5):

wherein $R^{23}$ to $R^{26}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

6. The recording ink composition as claimed in claim 4, wherein, in formulae (1) and (2), said alkali metal cation represented by M⁺ is selected from the group consisting of Na⁺ and Li⁺; said quaternary ammonium cation represented by M⁺ is represented by formula (3):

wherein $R^3$ to $R^6$ each is selected from the group consisting of a hydrogen atom, an alkyl group having 1 to 4 carbon atoms, and a halogenated alkyl group having 1 to 4 carbon atoms; said alkanolamine cation represented by M⁺ is a cation represented by formula (4):

wherein at least one of $R^{13}$ to $R^{16}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms; and said quaternary phosphonium cation represented by M⁺ is a cation represented by formula (5):

wherein $R^{23}$ to $R^{26}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

7. The recording ink composition as claimed in claim 1, wherein at least one of said surfactants having an alkyl group having 5 or more carbon atoms is a nonionic surfactant having a polyoxyalkylene group.

8. The recording ink composition as claimed in claim 3, further comprising a nonionic surf actant having a polyoxyalkylene group.

9. The recording ink composition as claimed in claim 4, further comprising a nonionic surfactant having a polyoxyalkylene group.

10. The recording ink composition as claimed in claim 5, further comprising a nonionic surfactant having a polyoxyalkylene group.

11. The recording ink composition as claimed in claim 6, further comprising a nonionic surfactant having a polyoxyalkylene group.

12. The recording ink composition as claimed in claim 7, wherein said nonionic surfactant having a polyoxyalkylene group comprises at least one surfactant compound selected from the group consisting of:

a compound of formula (6)

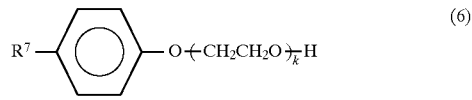

wherein $R^7$ is a straight or branched hydrocarbon chain having 6 to 14 carbon atoms, and k is an integer of 5 to 20;

a compound of formula (7),

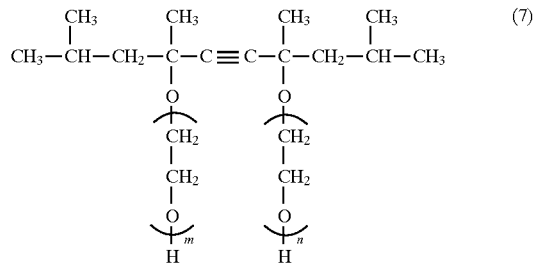

wherein m and n are each an integer of 0 to 20;

a compound of formula (8),

wherein $R^8$ is a straight or branched hydrocarbon chain having 6 to 14 carbon atoms, and n is an integer of 5 to 20; and a compound of formula (9),

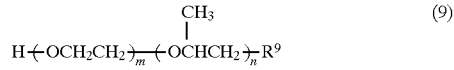

wherein $R^9$ is a straight or branched hydrocarbon chain having 6 to 14 carbon atoms, m and n are each an integer of 0 to 20, provided that m and n cannot be 0 (zero) at the same time.

13. The recording ink composition as claimed in claim 8, wherein said nonionic surfactant having a polyoxyalkylene group comprises at least one surfactant compound selected from the group consisting of:

a compound of formula (6)

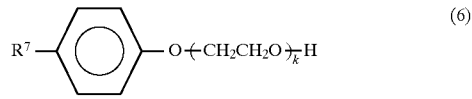

wherein $R^7$ is a straight or branched hydrocarbon chain having 6 to 14 carbon atoms, and k is an integer of 5 to 20;

a compound of formula (7),

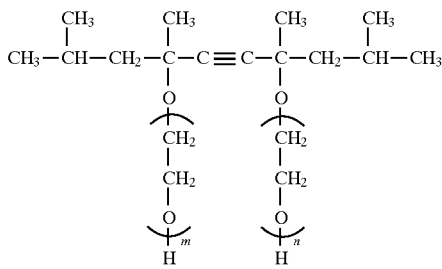

wherein m and n are each an integer of 0 to 2;
a compound of formula (8),

wherein $R^8$ is a straight or branched hydrocarbon chain having 6 to 14 carbon atoms, and n is an integer of 5 to 20; and
a compound of formula (9),

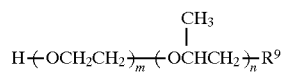

wherein $R^9$ is a straight or branched hydrocarbon chain having 6 to 14 carbon atoms, m and n are each an integer of 0 to 20, provided that m and n cannot be 0 (zero) at the same time.

14. The recording ink composition as claimed in claim 7, further comprising urea and at least one urea derivative.

15. The recording ink composition as claimed in claim 8, further comprising urea and at least one urea derivative.

16. The recording ink composition as claimed in claim 9, further comprising urea and at least one urea derivative.

17. The recording ink composition as claimed in claim 10, further comprising urea and at least one urea derivative.

18. The recording ink composition as claimed in claim 11, further comprising urea and at least one urea derivative.

19. The recording ink composition as claimed in claim 12, further comprising urea and at least one urea derivative.

20. The recording ink composition as claimed in claim 1, wherein said water-soluble organic solvent comprises at least one pyrrolidone derivative.

21. The recording ink composition as claimed in claim 1, wherein said pigment has an HLB value in a range of 11 to 20, and said polymeric dye comprises a carboxylic group or a sulfonic acid group in a repeating unit thereof.

22. The recording ink composition as claimed in claim 21, wherein at least one of said surfactants having an alkyl group having 5 or more carbon atoms is a nonionic surfactant having a polyoxyalkylene group.

23. The recording ink composition as claimed in claim 21, wherein said pigment is in the form of particles having a particle diameter in a range of 0.01 μm to 0.1 μm.

24. The recording ink composition as claimed in claim 22, wherein said pigment is in the form of particles having a particle diameter in a range of 0.01 μm to 0.1 μm.

25. The recording ink composition as claimed in claim 21, wherein at least one of said surfactants having an alkyl group having 5 or more carbon atoms is selected from the group consisting of:

a polyoxyethylene alkyl ether acetate of formula (1),

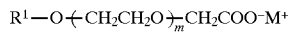

wherein $R^1$ is a straight chain or branched alkyl group having 6 to 14 carbon atoms, $M^+$ is a cation selected from the group consisting of alkali metal cation, quaternary ammonium cation, quaternary phosphonium cation, and alkanol amine cation, and m is an integer of 3 to 12; and a dialkylsulfosuccinate of formula (2),

wherein $R^2$ is a branched alkyl group having 5 to 7 carbon atoms, and $M^+$ is a cation selected from the group consisting of alkali metal cation, quaternary ammonium cation, quaternary phosphonium cation, and alkanol amine cation.

26. The recording ink composition as claimed in claim 21, wherein at least two of said surfactants having an alkyl group having 5 or more carbon atoms are:
a polyoxyethylene alkyl ether acetate of formula (1),

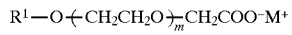

wherein $R^1$ is a straight chain or branched alkyl group having 6 to 14 carbon atoms, $M^+$ is a cation selected from the group consisting of alkali metal cation, quaternary ammonium cation, quaternary phosphonium cation, and alkanol amine cation, and m is an integer of 3 to 12; and
a dialkylsulfosuccinate of formula (2),

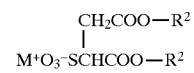

wherein $R^2$ is a branched alkyl group having 5 to 7 carbon atoms, and $M^+$ is a cation selected from the group consisting of alkali metal cation, quaternary ammonium cation, quaternary phosphonium cation, and alkanol amine cation.

27. The recording ink composition as claimed in claim 25, wherein, in formulae (1) and (2), said alkali metal cation represented by $M^+$ is selected from the group consisting of $Na^+$ and $Li^+$; said quaternary ammonium cation represented by $M^+$ is a cation represented by formula (3);

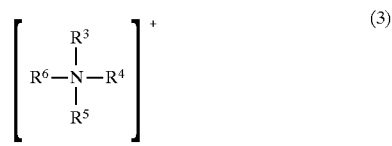

wherein $R^3$ to $R^6$ are each selected from the group consisting of a hydrogen atom, an alkyl group having 1 to 4 carbon atoms, and a halogenated alkyl group having 1 to 4 carbon atoms; said alkanolamine cation represented by $M^+$ is a cation represented by formula (4);

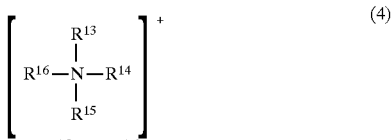

wherein at least one of $R^{13}$ to $R^{16}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms; and said quaternary phosphonium cation represented by $M^+$ is a cation represented by formula (5):

$$\left[\begin{array}{c} R^{23} \\ | \\ R^{26}-P-R^{24} \\ | \\ R^{25} \end{array}\right]^+ \quad (5)$$

wherein $R^{23}$ to $R^{26}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

28. The recording ink composition as claimed in claim 26, wherein, in formulae (1) and (2), said alkali metal cation represented by $M^+$ is selected from the group consisting of $Na^+$ and $Li^+$; said quaternary ammonium cation represented by $M^+$ is a cation represented by formula (3):

$$\left[\begin{array}{c} R^{3} \\ | \\ R^{6}-N-R^{4} \\ | \\ R^{5} \end{array}\right]^+ \quad (3)$$

wherein $R^3$ to $R^6$ are each selected from the group consisting of a hydrogen atom, an alkyl group having 1 to carbon atoms, and a halogenated alkyl group having 1 to carbon atoms; said alkanolamine cation represented by $M^+$ a cation represented by formula (4):

$$\left[\begin{array}{c} R^{13} \\ | \\ R^{16}-N-R^{14} \\ | \\ R^{15} \end{array}\right]^+ \quad (4)$$

wherein at least one of $R^{13}$ to $R^{16}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms; and said quaternary phosphonium cation represented by $M^+$ is a cation represented by formula (5):

$$\left[\begin{array}{c} R^{23} \\ | \\ R^{26}-P-R^{24} \\ | \\ R^{25} \end{array}\right]^+ \quad (5)$$

wherein $R^{23}$ to $R^{26}$ each is selected from the group consisting of a hydrogen atom, an alkyl group having 1 to 4 carbon atoms, a hydroxy alkyl group having 1 to 4 carbon atoms, and a halogenated alkyl group having 1 to 4 carbon atoms.

29. The recording ink composition as claimed in claim 22, wherein said nonionic surfactant having a polyoxyalkylene group comprises at least one surfactant compound selected from the group consisting of:

a compound of formula (6)

$$R^7-\phi-O(CH_2CH_2O)_k H \quad (6)$$

wherein $R^7$ is a straight or branched hydrocarbon chain having 6 to 14 carbon atoms, and k is an integer of 5 to 20;

a compound of formula (7), $$CH_3-CH-CH_2-\underset{\underset{\underset{H}{\overset{|}{O}}}{\overset{|}{\underset{CH_2}{\overset{|}{\underset{CH_2}{\overset{|}{\underset{O}{\overset{|}{\underset{}{}}}}}}}}}}{\overset{CH_3}{\overset{|}{C}}}-C\equiv C-\underset{\underset{\underset{H}{\overset{|}{O}}}{\overset{|}{\underset{CH_2}{\overset{|}{\underset{CH_2}{\overset{|}{\underset{O}{\overset{|}{\underset{}{}}}}}}}}}}{\overset{CH_3}{\overset{|}{C}}}-CH_2-CH-CH_3 \quad (7)$$

wherein m and n are each an integer of 0 to 20;

a compound of formula (8), $$R^8(OCH_2CH_2)_n OH \quad (8)$$

wherein $R^8$ is a straight or branched hydrocarbon chain having 6 to 14 carbon atoms, and n is an integer of 5 to 20; and a compound of formula (9), $$H(OCH_2CH_2)_m (OCHCH_2)_n R^9 \quad (9)$$
$$\qquad\qquad\qquad\qquad |$$
$$\qquad\qquad\qquad\quad CH_3$$

wherein $R^9$ is a straight or branched hydrocarbon chain having 6 to 14 carbon atoms, m and n are each an integer of 0 to 20, provided that m and n cannot be 0 (zero) at the same time.

30. The recording ink composition as claimed in claim 22, further comprising urea and at least one urea derivative.

31. The recording ink composition as claimed in claim 25, further comprising urea and at least one urea derivative.

32. The recording ink composition as claimed in claim 26, further comprising urea and at least one urea derivative.

33. The recording ink composition as claimed in claim 29, wherein said water-soluble organic solvent comprises at least one pyrrolidone derivative.

34. The recording ink composition as claimed in claim 29, further comprising urea and at least one urea derivative.

35. The recording ink composition as claimed in claim 21, wherein said water-soluble organic solvent comprises at least one pyrrolidone derivative.

36. The recording ink composition as claimed in claim 1, wherein said pigment comprises at least one pigment component selected from the group consisting of a quinacridone pigment of formula (P-1), (P-1 structural formula with $R^{11}$, $R^{12}$, NH groups and C=O groups)

wherein $R^{11}$ and $R^{12}$ are each an alkyl group, a halogen atom, or a hydrogen atom, and a phthalocyanine pigment of formula (P-2)

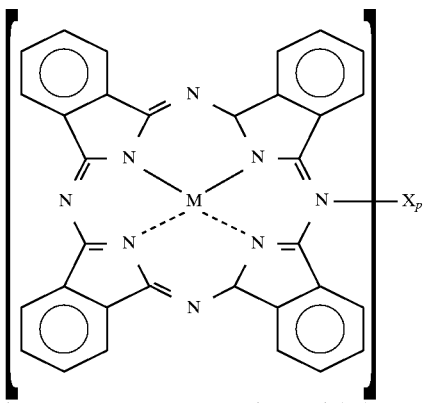

wherein M represents copper, iron, nickel or a hydrogen atom, X represents a hydrogen atom or a halogen atom, and p is an integer of 0 to 8, and said polymeric dye comprises a salt made from a polymeric compound having a sulfonic group and a basic dye.

37. The recording ink composition as claimed in claim 36, wherein at least one of said surfactants having an alkyl group having 5 or more carbon atoms is a nonionic surfactant having a polyoxyalkylene group.

38. The recording ink composition as claimed in claim 36, wherein said pigment is in the form of particles having a particle diameter in a range of 0.01 μm to 0.1 μm.

39. The recording ink composition as claimed in claim 37, wherein said pigment is in the form of particles having a particle diameter in a range of 0.01 μm to 0.1 μm.

40. The recording ink composition as claimed in claim 36, further comprising finely-divided particles of titanium oxide with a particle size of 0.1 μm or less together with said pigment and said polymeric dye.

41. The recording ink composition as claimed in claim 37, further comprising finely-divided particles of titanium oxide with a particle size of 0.1 μm or less together with said pigment and said polymeric dye.

42. The recording ink composition as claimed in claim 38, further comprising finely-divided particles of titanium oxide with a particle size of 0.1 μm or less together with said pigment and said polymeric dye.

43. The recording ink composition as claimed in claim 39, further comprising finely-divided particles of titanium oxide with a particle size of 0.1 μm or less together with said pigment and said polymeric dye.

44. The recording ink composition as claimed in claim 36, wherein said pigment component for said pigment is said quinacridone pigment of formula (P-1), and said basic dye is a dye represented by formula (D-1),

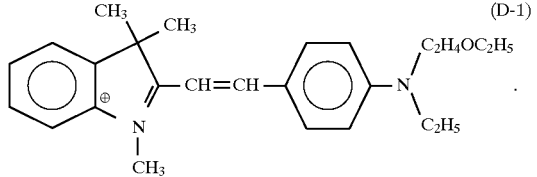

45. The recording ink composition as claimed in claim 36, wherein said pigment component for said pigment is said phthalocyanine pigment of formula (P-2), and said basic dye is a dye represented by formula (D-2),

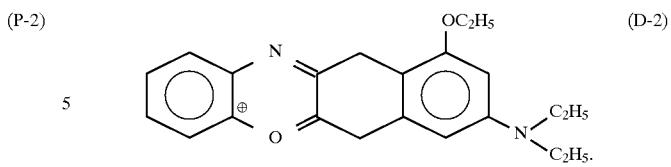

46. The recording ink composition as claimed in claim 37, wherein said nonionic surfactant having a polyoxyalkylene group comprises at least one surfactant compound selected from the group consisting of:

a compound of formula (6)

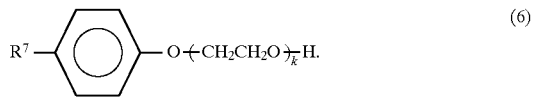

wherein $R^7$ is a straight or branched hydrocarbon chain having 6 to 14 carbon atoms, and k is an integer of 5 to 20;

a compound of formula (7),

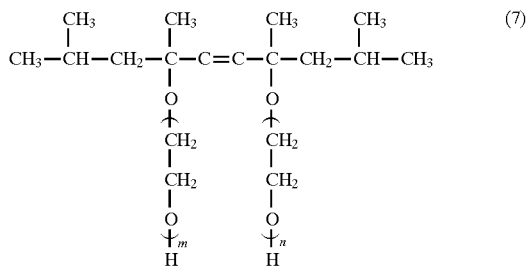

wherein m and n are each an integer of 0 to 20;

a compound of formula (8),

wherein $R^8$ is a straight or branched hydrocarbon chain having 6 to 14 carbon atoms, and n is an integer of 5 to 20; and a compound of formula (9),

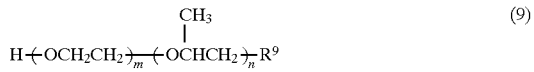

wherein $R^9$ is a straight or branched hydrocarbon chain having 6 to 14 carbon atoms, m and n are each an integer of 0 to 20, provided that m and n cannot be 0 (zero) at the same time.

47. The recording ink composition as claimed in claim 36, wherein said polymeric compound is a copolymer made from p-styrenesulfonic acid and hydroxyethyl methacrylate or hyroxyethylacrylate serving as repeating units of said copolymer.

48. The recording ink composition as claimed in claim 44, wherein said polymeric compound is a copolymer made from p-styrenesulfonic acid and hydroxyethyl methacrylate or hyroxyethylacrylate serving as repeating units of said copolymer.

49. The recording ink composition as claimed in claim 45, wherein said polymeric compound is a copolymer made from p-styrenesulfonic acid and hydroxyethyl methacrylate or hyroxyethylacrylate serving as repeating units of said copolymer.

50. The recording ink composition as claimed in claim 37, further comprising urea and at least one urea derivative.

51. The recording ink composition as claimed in claim 46, further comprising urea and at least one urea derivative.

52. The recording ink composition as claimed in claim 36, wherein said water-soluble organic solvent comprises at least one pyrrolidone derivative.

53. A method of recording images on an image receiving medium, comprising the step of ejecting a recording ink composition in the form of droplets by the application of thermal or mechanical energy thereto onto an image receiving medium with a Stockigt size degree of 3 seconds or more, with said recording ink composition being deposited in an amount of 2.0 g/m² to 20 g/m² on said image receiving medium, thereby forming images with a resolution of 10 dots/mm×10 dots/mm or more, said recording ink composition comprising:

- a colorant comprising a pigment which is soluble or dispersible in water, and a polymeric dye having a weight average molecular weight in a range of 5,000 to 15,000,
- a dispersant comprising at least one dispersant component selected from the group consisting of at least one polymeric compound having a hydrophilic moiety and a hydrophobic moiety, and/or at least one surfactant having an alkyl group having 5 or more carbon atoms,
- water, and
- a water-soluble organic solvent.

54. The method of recording images on an image receiving medium as claimed in claim 53, wherein said pigment has an HLB value in a range of 11 to 20, and said polymeric dye comprises a carboxylic group or a sulfonic acid group in a repeating unit thereof.

55. The method of recording images on an image receiving medium as claimed in claim 53, wherein said pigment comprises at least one pigment component selected from the group consisting of a quinacridone pigment of formula (P-1),

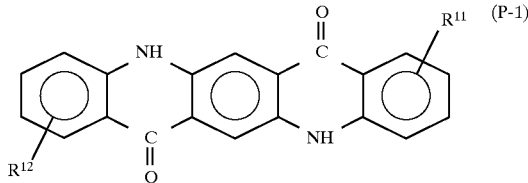

wherein $R^{11}$ and $R^{12}$ are each an alkyl group, a halogen atom, or a hydrogen atom, and a phthalocyanine pigment of formula (P-2)

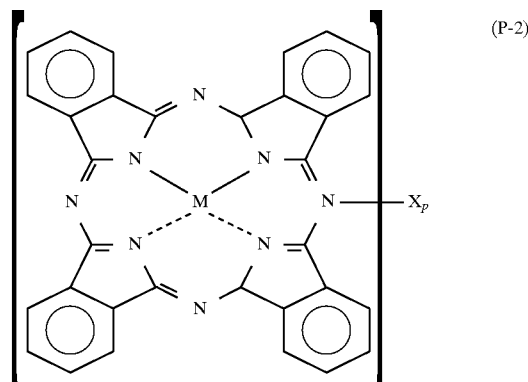

wherein M represents copper, iron, nickel or a hydrogen atom, X represents a hydrogen atom or a halogen atom, and p is an integer of 0 to 8, and said polymeric dye comprises a salt made from a polymeric compound having a sulfonic group and a basic dye.

* * * * *